(12) United States Patent
Watanabe et al.

(10) Patent No.: US 8,287,133 B2
(45) Date of Patent: Oct. 16, 2012

(54) IMAGE DISPLAY APPARATUS

(75) Inventors: Ryoki Watanabe, Shiojiri (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 12/877,403

(22) Filed: Sep. 8, 2010

(65) Prior Publication Data
US 2011/0090465 A1    Apr. 21, 2011

(30) Foreign Application Priority Data
Oct. 21, 2009 (JP) .................................. 2009-242512

(51) Int. Cl.
*G03B 21/14* (2006.01)
(52) U.S. Cl. .............................. 353/31; 348/742; 353/34
(58) Field of Classification Search .................... 353/31, 353/34, 37; 349/5, 7, 8; 348/742, 743
See application file for complete search history.

(56) References Cited

U.S. PATENT DOCUMENTS

| | | | |
|---|---|---|---|
| 6,588,906 B2 * | 7/2003 | Hwang | 353/31 |
| 6,814,450 B2 * | 11/2004 | Kim | 353/94 |
| 6,824,270 B2 * | 11/2004 | Kim et al. | 353/31 |
| 6,869,189 B2 * | 3/2005 | Kim et al. | 353/84 |
| 6,913,360 B2 * | 7/2005 | Cho et al. | 353/31 |
| 7,393,106 B2 * | 7/2008 | Kim et al. | 353/20 |

FOREIGN PATENT DOCUMENTS

JP    A-11-298829    10/1999
JP    A-2005-91519    4/2005

* cited by examiner

*Primary Examiner* — William C Dowling
(74) *Attorney, Agent, or Firm* — Oliff & Berridge, PLC

(57) ABSTRACT

An image display apparatus includes: a light source system that emits light having a first wavelength and a second wavelength switched with time; a light modulator that modulates the light having the first wavelength and the second wavelength emitted from the light source system; an optical path adjustment system that shifts the optical paths of the light having the first wavelength and the second wavelength modulated by the light modulator from each other; and the optical path adjustment system, wherein the optical path adjustment system includes a wavelength selecting surface that reflects the light having the first wavelength and transmits the light having the second wavelength, and mirror system disposed in such a way that the optical paths of the light having the first wavelength and the second wavelength having traveled via the wavelength selecting surface are shifted from each other.

9 Claims, 20 Drawing Sheets

$$b(i, j) = \frac{1}{4}\left\{a(2i, 2j)+a(2i+1, 2j)+a(2i, 2j+1)+a(2i+1, 2j+1)\right\}$$

$$c(i, j) = \frac{1}{4}\left\{a(2i+1, 2j+1)+a(2i+2, 2j+1)+a(2i+1, 2j+2)+a(2i+2, 2j+2)\right\}$$

IMAGE DISPLAY APPARATUS

BACKGROUND

1. Technical Field

The present invention relates to an image display apparatus.

2. Related Art

It is hoped that projectors and other image display apparatus can display an image at higher resolution. When an image formed by using a light modulator, such as liquid crystal light valve, is displayed, the number of pixels of the image displayed on a screen or any other surface is typically equal to the number of pixels of the light modulator. Increasing the resolution of the light modulator increases the resolution of the displayed image but results in significant increase in manufacturing cost.

To produce a high-resolution displayed image without increasing the resolution of the light modulator, it is conceivable to increase the number of light modulators. Forming images by using a plurality of light modulators and projecting the thus formed images in such a way that the position of each pixel of one image is shifted from those of the other images allow the total number of pixels on the screen to be increased. In this method, however, since the number of light modulators is increased, the cost increases accordingly. As a technique for solving the inconvenience described above, instead of increasing the number of light modulating devices to form a plurality of images, a method for forming a plurality of images in a time division manner by using a single light modulator has been proposed (JP-A-11-298829 and JP-A-2005-91519, for example).

In the image display apparatus described in JP-A-11-298829 and JP-A-2005-91519, image light formed by a light modulator in a time division manner is projected through a flat-plate prism. The flat-plate prism is inclined to the direction in which the image light is incident. The image light incident on the flat-plate prism exits therethrough with the optical path of the image light shifted in parallel. The amount of shift of the optical path before the light is incident on the flat-plate prism from the optical path after the light is incident on the flat-plate prism is controlled in synchronization with image formation. As a method for changing the amount of shift with time, JP-A-11-298829 describes the following first to third methods, and JP-A-2005-91519 describes a fourth method.

In a first method, the inclination angle of a flat-plate prism is changed with time. In a second method, a flat-plate prism formed of portions that produce different amounts of refraction is rotated to change with time the amount of refraction produced in the portion through which image light passes. In a third method, a flat-plate prism is made of a nonlinear optical crystal the refractive index of which can be variably controlled by applying an electric field, and the applied electric field is changed with time. In a fourth method, a light blocker is provided between the portions that produce different amounts of refraction in the second method.

The techniques described in JP-A-11-298829 and JP-A-2005-91519 have the following problems:

In the first, second, and fourth methods, the flat-plate prism could vibrate when spatially displaced. If the flat-plate prism vibrates, the amount of shift of the optical path changes unexpectedly, which makes it difficult to control the amount of shift with high precision, resulting in a decrease in the quality of a displayed image. An attempt to synchronize the displacement of the flat-plate prism with image formation in a spatial light modulator with high precision makes a mechanism for spatially moving the flat-plate prism complicated. Further, the vibration of the flat-plate prism could produce noise and shorten the lifetime thereof.

In the first method, since images are displayed even while the pixels are shifted, the image could be blurred. In the second method, since the pixels in the vicinity of the boundary between the portions that produce different amounts of refraction are separated, and the pixel shift timing on one end side of a displayed image differs from the pixel shift timing on the other end side of the displayed image, for example, the quality of the displayed image could decrease. Although employing the fourth method can prevent the pixels from being separated, the problem of the difference in the pixel shift timing in a displayed image is still unsolved.

In the third method, the size of the nonlinear optical crystal needs to be greater than or equal to the spot size of incident image light. Applying an electric field strong enough to ensure the amount of shift necessary to provide a sense of high resolution to the thus sized nonlinear optical crystal requires a voltage higher than those for driving a light modulator and other components, resulting in an increase in voltage required to drive the entire image display apparatus.

In the third method, using the Kerr effect disadvantageously increases the cost of the nonlinear optical crystal, resulting in loss of superiority over a method of increasing the number of light modulators. On the other hand, using the Pockels effect results in a decrease in light usage efficiency because the visible light transmittance of the nonlinear optical crystal decreases, necessity of controlling the state of the nonlinear optical crystal, and other inconveniences. As described above, it is not realistic to variably control the optical path of image light by using a nonlinear optical crystal.

SUMMARY

An advantage of some aspects of the invention is to provide an image display apparatus capable of displaying a high-quality image.

An image display apparatus of an aspect of the invention includes a light source system that emits light having a first wavelength and light having a second wavelength switched with time, a light modulator that modulates the light having the first wavelength and the light having the second wavelength emitted from the light source system, an optical path adjustment system that shifts the optical paths of the light having the first wavelength and the light having the second wavelength modulated by the light modulator from each other, and a projection system that projects the light having traveled via the optical path adjustment system. The optical path adjustment system includes a wavelength selecting surface that reflects the light having the first wavelength and transmits the light having the second wavelength and a mirror system disposed in such a way that the optical paths of the light having the first wavelength and the light having the second wavelength having traveled via the wavelength selecting surface are shifted from each other but the traveling directions thereof are the same.

The light emitted from the light source system is modulated by the light modulator. The light modulated by the light modulator travels via the optical path adjustment system, is projected through the projection system, and is displayed as an image. Since the light source system emits light having a first wavelength and light having a second wavelength switched with time, the modulated light having the first wavelength and the modulated light having the second wavelength are incident on the wavelength selecting surface switched with time. Since the optical paths of the light having the first wavelength and the light having the second wavelength are shifted from each other when they travel via the wavelength selecting surface and the mirror system, an image formed by the projected light having the first wavelength and an image formed by the projected light having the second wavelength are displayed in positions shifted from each other.

According to the image display apparatus of the aspect of the invention, an image corresponding to the first wavelength and an image corresponding to the second wavelength can be displayed with their positions temporally and spatially shifted from each other without dynamic control of the optical path adjustment system itself. Unlike a case where a flat-plate prism or any other similar component is spatially displaced to shift the optical paths from each other, the optical path adjustment system will not vibrate and any adverse effect due to vibration will not occur. Further, unlike a case where the refractive index of a nonlinear optical crystal is variably controlled in an electrical manner, the voltage for driving the image display apparatus will not increase. Moreover, since the entire light flux having the first wavelength or the entire light flux having the second wavelength can be collectively shifted, the pixels can be shifted in a displayed image at the same timing. As described above, the invention provides an image display apparatus capable of displaying a high-quality image.

The image display apparatus according to the aspect of the invention can be implemented in the following representative forms.

The optical path adjustment system may produce the amount of shift by which the optical path of the light having the first wavelength and the optical path of the light having the second wavelength are shifted from each other in such a way that a pixel formed by the light having the first wavelength overlaps with a plurality of pixels formed by the light having the second wavelength in an imaging plane where the light projected through the projection system is focused.

In this way, pixels formed by the light having the first wavelength can fill the gaps between pixels formed by the light having the second wavelength, whereby the resolution of a displayed image can be effectively increased.

The mirror system may be formed of a reflection surface disposed substantially in parallel to the wavelength selecting surface.

In this way, the optical path of the light of the second wavelength reflected on the reflection surface is substantially parallel to the optical path of the light of the first wavelength reflected on the wavelength selecting surface. The amount of shift by which the optical paths are shifted from each other in the optical path adjustment system can therefore be determined by the distance between the wavelength selecting surface and the reflection surface and the angle of incidence of the light incident on the wavelength selecting surface. The optical path adjustment system having a simple configuration can still set the amount of shift by which the optical paths are shifted from each other with high precision.

The wavelength selecting surface may be formed on the same optical element on which the reflection surface is formed.

As compared with a case where the wavelength selecting surface and the reflection surface are formed on separate elements, the relative positional relationship between the wavelength selecting surface and the reflection surface can be set with high precision, whereby change in the relative positional relationship between the wavelength selecting surface and the reflection surface over time can be significantly reduced. Further, the number of interfaces between the wavelength selecting surface and the reflection surface can be reduced, whereby light loss at the interfaces can be reduced.

The light source system may include a first solid-state light source that emits light having the first wavelength and a second solid-state light source that emits light having the second wavelength, and the first and second solid-state light sources may be driven in such a way that the period during which the first solid-state light source is turned on is shifted from the period during which the second solid-state light source is turned on.

In this way, the period during which the first solid-state light source is turned on can be shifted from the period during which the second solid-state light source is turned on through electrical control. As a result, the light emitted from the light source system can be readily switched with time between the light having the first wavelength and the light having the second wavelength. Further, the period during which the first solid-state light source is turned on and the period during which the second solid-state light source is turned on can be controlled with high precision.

The image display apparatus may further include a controller that controls the light source system and the light modulator, and the controller may supply a first modulation signal corresponding to an image to be displayed by using the light having the first wavelength and a second modulation signal corresponding to an image to be displayed by using the light having the second wavelength to the light modulator switched with time to turn on the first solid-state light source in synchronization with the first modulation signal and turn on the second solid-state light source in synchronization with the second modulation signal.

In this way, the timing at which the light having the first wavelength is incident on the light modulator can be precisely synchronized with the timing at which the light having the first wavelength is modulated in accordance with an image to be displayed by using the light having the first wavelength. Further, the timing at which the light having the second wavelength is incident on the light modulator can be precisely synchronized with the timing at which the light having the second wavelength is modulated.

At least one of the first and second solid-state light sources may be formed of a light emitting diode.

In this way, the lifetime of the light source system and hence the lifetime of the image display apparatus can be prolonged. As compared with a case where a laser diode is used as the solid-state light source, light within a desired wavelength band is readily obtained, and the configuration of the light source system can be simplified.

At least one of the first and second solid-state light sources may be formed of a laser diode.

In general, since the spectral bandwidth of laser light is significantly narrower than the spectral bandwidth of the light emitted from a light emitting diode (LED) or any other similar device, the light having the first wavelength and the light having the second wavelength can be readily separated with high precision at the wavelength selecting surface.

The image display apparatus may further include a second light source system that emits light having a third wavelength longer than the first and second wavelengths, a third light source system that emits light having a fourth wavelength shorter than the first and second wavelengths, a second light modulator that modulates the light emitted from the second light source system, a third light modulator that modulates the light emitted from the third light source system, and a light combining element that combines the light modulated by the light modulator, the light modulated by the second light modulator, and the light modulated by the third light modulator. The wavelength selecting surface may reflect one of light having a wavelength longer than a predetermined wavelength between the first and second wavelengths and light having a wavelength shorter than the predetermined wavelength and transmit the other light. The optical paths of the light fluxes that exit out of the light combining element may be configured in such a way that one of the optical path of the light having the third wavelength and the optical path of the light having the fourth wavelength substantially coincides with the optical path of the light having the first wavelength, and that the optical path of the light having the third wavelength is shifted from the optical path of the light having the fourth wavelength. The amount of shift by which the optical path of the light having the third wavelength that exits out of the light combining element and the optical path of the light having the fourth wavelength that exits out of the light combining element are shifted from each other is set in such a way that the optical path of the light of the third wavelength having traveled via the optical path adjustment system substantially coincides with the optical path of the light of the fourth wavelength having traveled via the optical path adjustment system.

In this way, the light emitted from the light source system, the light emitted from the second light source system, and the light emitted from the third light source system are modulated by the light modulator, the second light modulator, and the third light modulator, respectively, and then combined in the light combining element. In the combined light, the relative relationship between the optical path of the light having the third wavelength and the optical path of the light having the fourth wavelength changes before and after they travel via the optical path adjustment system. The optical path of the light having the third wavelength and the optical path of the light having the fourth wavelength, which are shifted from each other before they are incident on the optical path adjustment system, substantially coincide with each other after they travel via the optical path adjustment system. As a result, the position of each pixel formed by the light having the third wavelength and the position of each pixel formed by the light having the fourth wavelength substantially coincide with the position of each pixel formed by one of the light having the first wavelength and the light having the second wavelength.

As described above, since the light fluxes having the first to fourth wavelengths can form and display an image having a large number of hues, the resultant image display apparatus can display a high-quality image. Further, the position where each pixel formed by the following three light fluxes, one of the light having the first wavelength and the light having the second wavelength, the light having the third wavelength, and the light having the fourth wavelength, is displayed is shifted from the position where each pixel formed by the other one of the light having the first wavelength and the light having the second wavelength is displayed, and the displayed image as a whole forms a high-resolution image. As described above, since the single optical path adjustment system can adjust the optical paths of the light fluxes having the first to fourth wavelengths, the configuration of the image display apparatus can be simplified and the resolution of an image can be effectively increased at the same time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
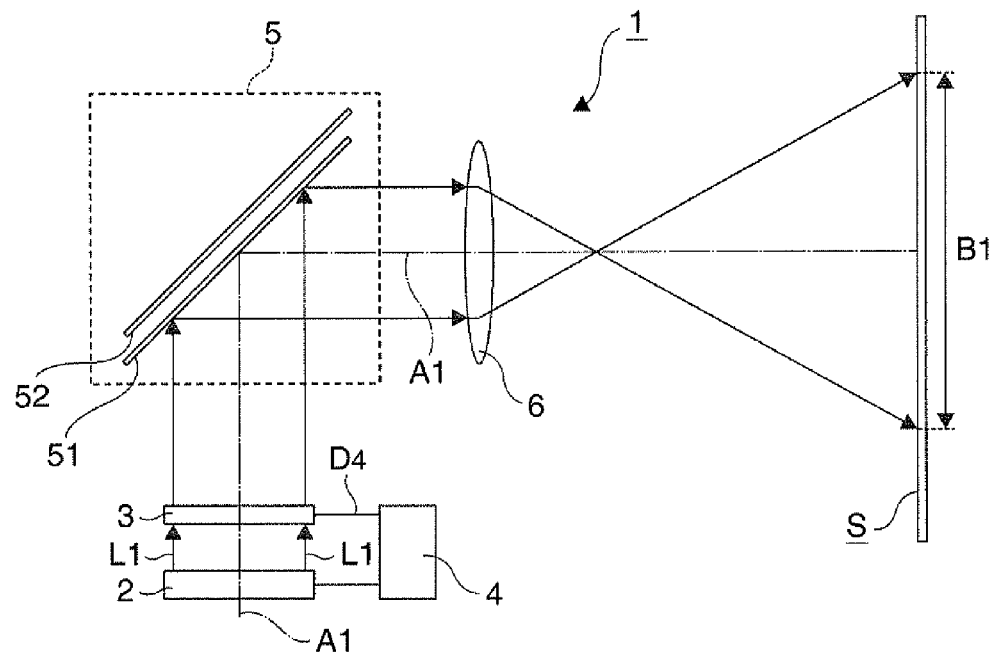
FIGS. 1A and 1B are schematic views showing the configuration of an image display apparatus of a first embodiment.

Embodiments of the invention will be described below with reference to the drawings. In the drawings used in the description, the dimensions and scales of structures in the drawings sometimes differ from actual dimensions and scales of the structures in order that characteristic portions are readily understood. Optical paths are sometimes not drawn as they are but are represented only by their central axes. Similar components in the embodiments have the same reference characters, and no detailed description thereof will be made in some cases.

First Embodiment

Figure 1B:
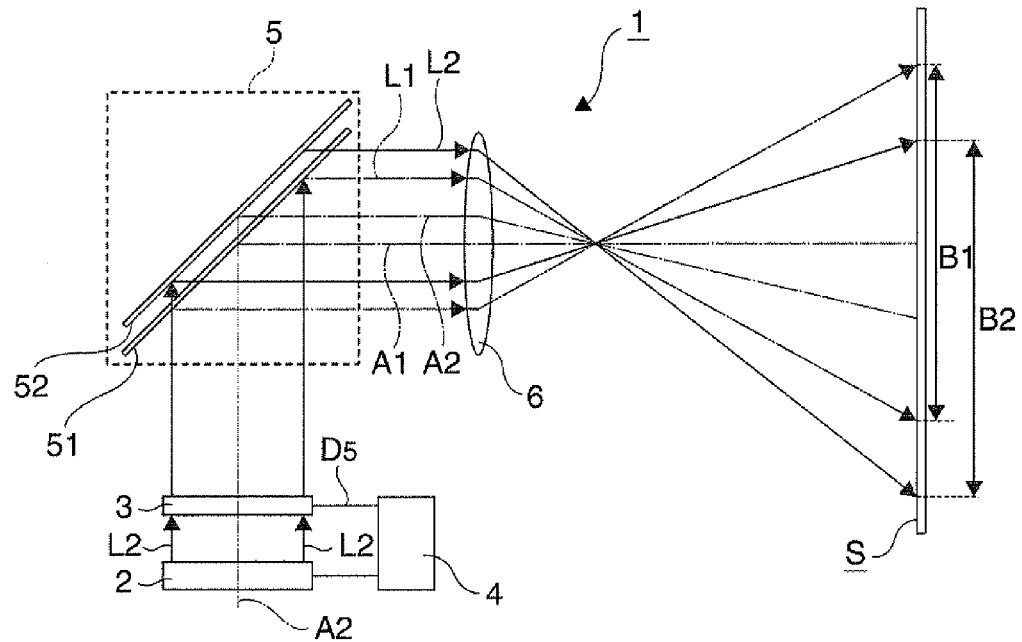
Figure 2A:
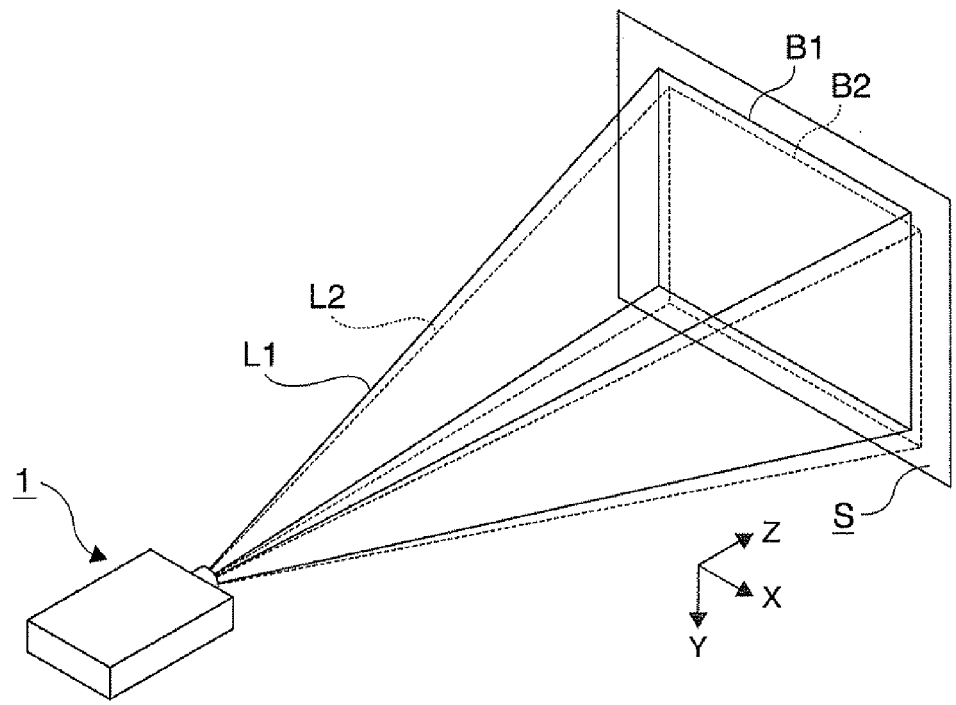
FIGS. 2A and 2B are conceptual diagrams of an image display method based on pixel shifting.
Figure 2B:
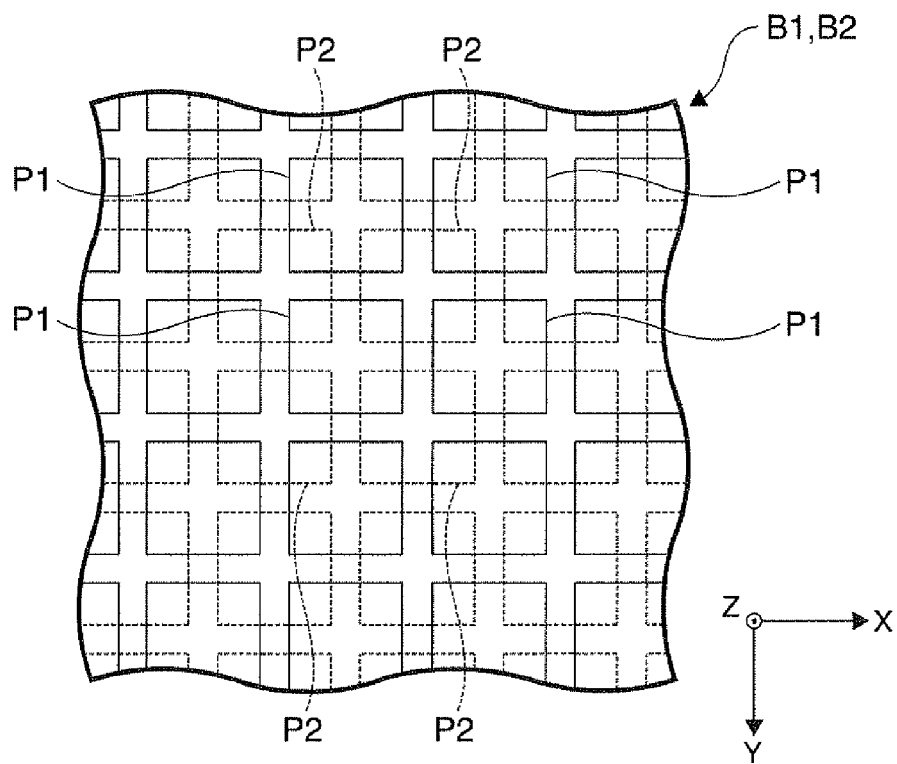

FIGS. 1A and 1B are schematic views showing the configuration of a projector (image display apparatus) 1 of a first embodiment. FIG. 1A shows a state in which an image formed by light having a first wavelength is displayed. FIG. 1B shows a state in which an image formed by light having a second wavelength is displayed. FIG. 1B also shows the light having the first wavelength to compare it with the light having the second wavelength. FIG. 2A is a conceptual diagram showing an image display method based on pixel shifting. FIG. 2B is an enlarged plan view showing pixels of an image displayed by using the pixel shifting.

As shown in FIGS. 1A and 1B, the projector 1 includes a light source system 2, a light modulator 3, a controller 4, an optical path adjustment system 5, and a projection system 6. The projector 1 generally operates as follows:

The light source system 2 emits light L1 having a first wavelength and light L2 having a second wavelength different from the first wavelength switched with time. The light L1 and L2 emitted from the light source system 2 is incident on the light modulator 3 and modulated thereby. The controller 4 controls the timing at which the light L1 and the light L2 are emitted from the light source system 2 and supplies a first modulation signal for modulating the light L1 and a second modulation signal for modulating the light L2 switched with time to the light modulator 3 in synchronization with the timing described above.

The light L1 and the light L2 modulated by the light modulator 3 are incident on the optical path adjustment system 5 in a time sequential manner. Looking at the optical paths of the light L1 and the light L2 before they are incident on the optical path adjustment system 5, one can see that the optical path A1 of the light L1 having the first wavelength substantially coincides with the optical path A2 of the light L2 having the second wavelength. The optical path adjustment system 5 includes a wavelength selecting surface 51 characterized by reflecting the light L1 and transmitting the light L2 and a reflection surface (mirror system) 52 that reflects the light L2 having the second wavelength having passed through the wavelength selecting surface 51. The light L1 is reflected on the wavelength selecting surface 51 and incident on the projection system 6. The light L2 passes through the wavelength selecting surface 51, is reflected on the reflection surface 52, passes through the wavelength selecting surface 51 again, and enters on the projection system 6.

As shown in FIG. 1B, the optical path A2 of the light L2 having traveled via the optical path adjustment system 5 is shifted from the optical path A1 of the light L1 having traveled via the optical path adjustment system 5. Looking at the optical paths of the light L1 and the light L2 having exited out of the optical path adjustment system 5, one can see that the optical path A2 of the light L2 having the second wavelength is substantially parallel to the optical path A1 of the light L1 having the first wavelength. Further, the optical path A1 of the light L1 having the first wavelength and the optical path A2 of the light L2 having the second wavelength are shifted from each other in a direction substantially perpendicular to the direction in which the light L1 having the first wavelength and the light L2 having the second wavelength travel.

The light L1 and the light L2 having traveled via the optical path adjustment system 5 enters the projection system 6 in a time sequential manner and are projected on a projection surface (a surface on which an image is focused) S, such as a screen.

As shown in FIG. 2A, a first image B1 formed by the light L1 projected on the projection surface S is displayed and a second image B2 formed by the light L2 projected on the projection surface S is displayed. Since the optical path of the light L1 having exited out of the projection system 6 is shifted from the optical path of the light L2 having exited out of the projection system 6, the position of each pixel P1 that forms the first image B1 is shifted from the position of each pixel P2 that forms the second image B2 as shown in FIG. 2B. The images B1 and B2 are displayed while being switched with time at a speed high enough not to let a viewer be aware of the switching. The viewer observes the images B1 and B2 superimposed with the positions of the pixels P1 and P2 shifted from each other, whereby an effectively higher resolution image is displayed. The components of the projector 1 will be described below in detail.

Figure 3:
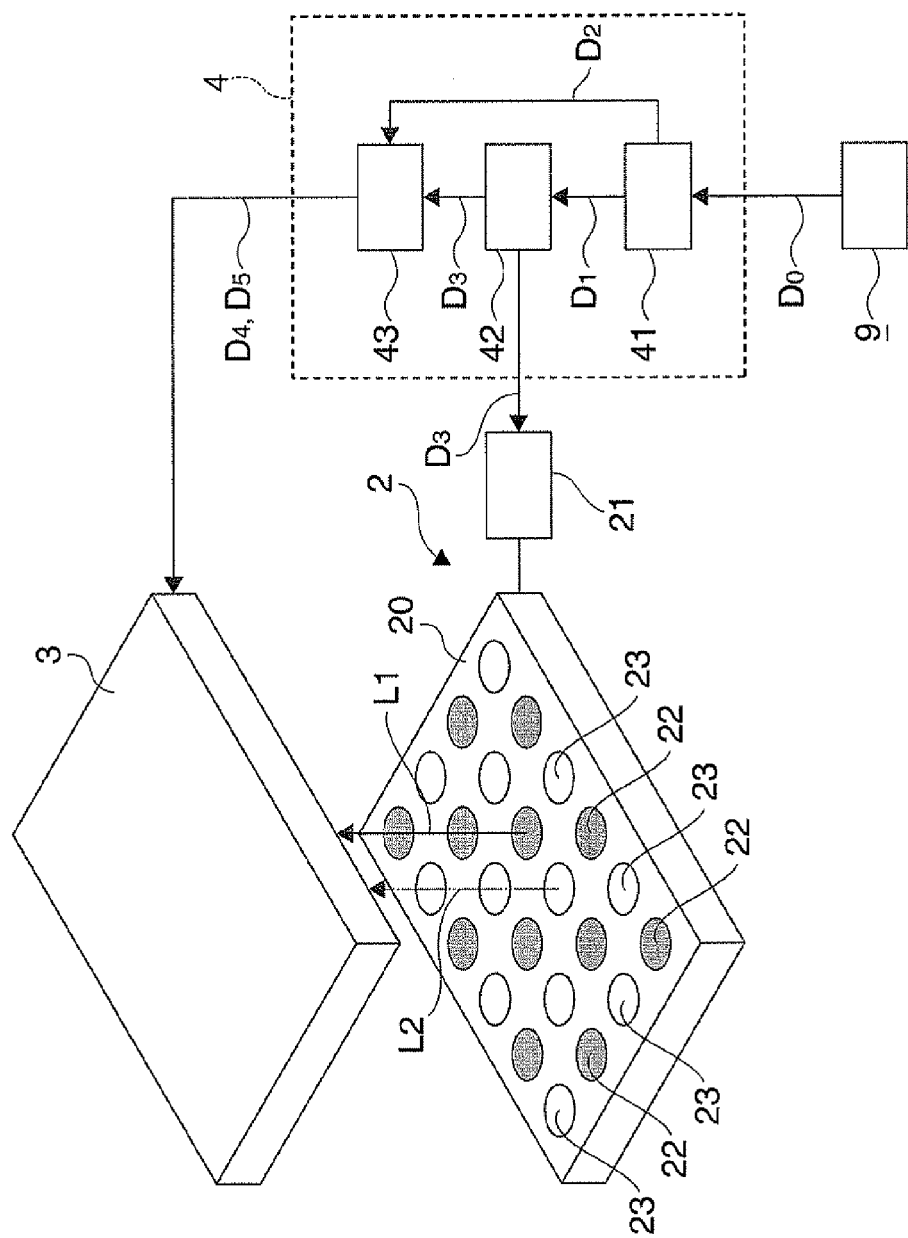
FIG. 3 is a schematic view showing the configurations of a light source system, a light modulator, and a controller.
Figure 4:
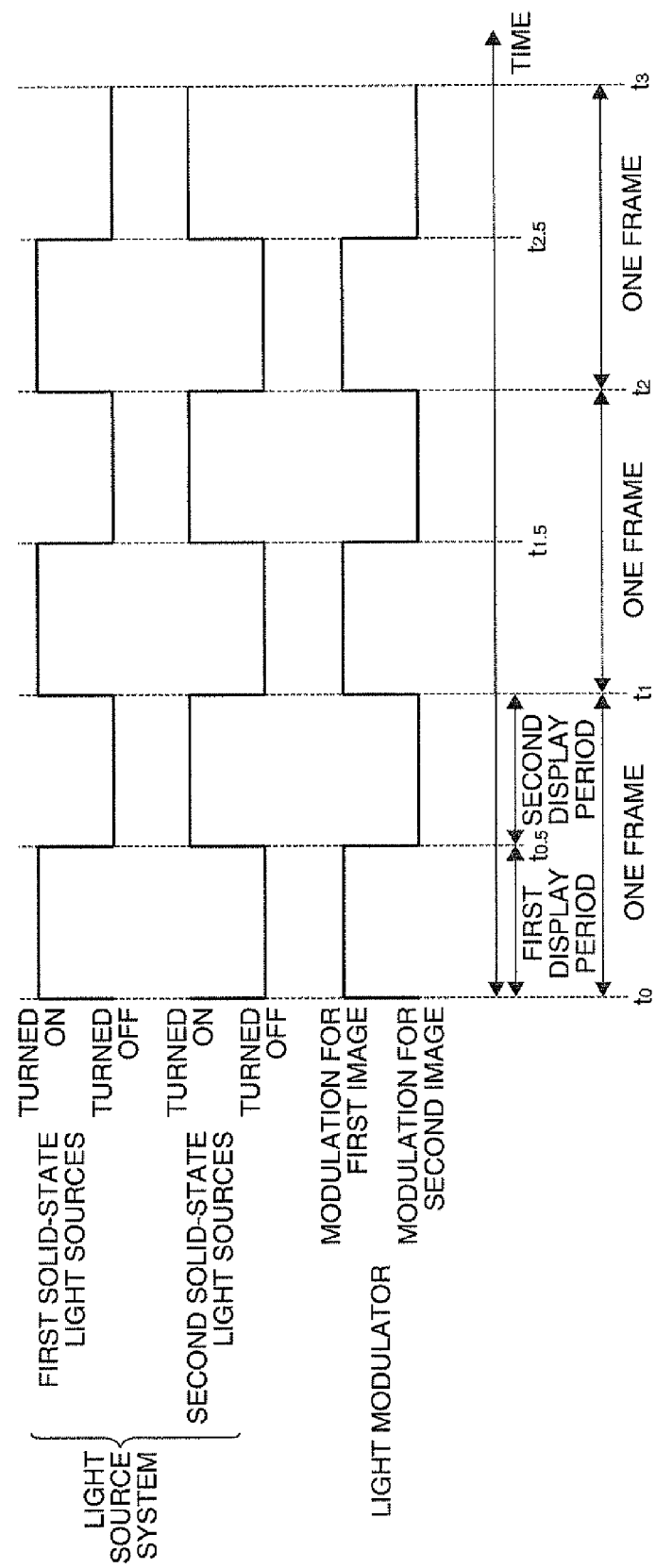
FIG. 4 is a chart showing an example of the timing at which the light source system and the light modulator operate.

FIG. 3 is a schematic view showing the configurations of the light source system 2, the light modulator 3, and the controller 4, and FIG. 4 is a timing chart showing an example of the timing at which the light source system 2 and the light modulator 3 operate.

As shown in FIG. 3, the light source system 2 includes a light emitting panel 20 and a driver 21. The light emitting panel 20 has a plurality of first solid-state light sources 22 and a plurality of second solid-state light sources 23 arranged therein in a two-dimensional manner. The first solid-state light sources and the second solid-state light sources 23 are alternately arranged in two arrangement directions.

Each of the solid-state light sources 22 and 23 is formed of a light emitting diode (LED), a laser diode (LD), or any other suitable solid-state light source. In the present embodiment, each of the solid-state light sources 22 and 23 is formed of an LED. Each of the first solid-state light sources 22 emits the light L1, the intensity peak of which occurs at the first wavelength, and each of the second solid-state light sources 23 emits the light L2, the intensity peak of which occurs at the second wavelength different from the first wavelength. When each of the solid-state light sources 22 and 23 is formed of an LED, green light can be directly produced more easily than by using an LD. Further, the light source system 2 formed of LEDs consumes less electric power and lasts longer than in a case where a lamp-based light source is used.

It is herein assumed that the second wavelength is selected from a wavelength band that belongs to a hue (green, for example) that is substantially the same as a hue to which the first wavelength belongs and that the second wavelength is shorter than the first wavelength. The difference between the first and second wavelengths is set at a value that allows the light L1 and the light L2 can be separated at the wavelength selecting surface or a value greater than the thus set value. The difference between the first and second wavelengths, for example, ranges from approximately 10 to 100 nm.

The driver 21 turns on and off the plurality of first solid-state light sources 22 together. The driver 21 also turns on and off the plurality of second solid-state light sources 23 together. The driver 21 can instantaneously perform the switching of the state of the first solid-state light sources 22 and the state of the second solid-state light sources 23 between on and off in an electrical manner. The driver 21 is not necessarily provided in the light source system 2 but may be provided in the controller 4.

The light modulator 3 modulates the light incident thereon based on modulation signals $D_4$ and $D_5$ supplied from the controller 4 and forms images. The light modulator 3 is formed of a transmissive or reflective liquid crystal light valve, a digital mirror device (DMD), or any other suitable spatial light modulator. The light modulator 3 in the first embodiment is formed of a transmissive liquid crystal light valve.

A parallelizing system, an illuminance homogenizing system, and other optical components are provided as required in the optical path between the light source system 2 and the light modulator 3. The parallelizing system, which is formed of a field lens or any other similar component, parallelizes the light to be incident on the light modulator 3. The illuminance homogenizing system, which is formed of a fly's-eye lens, a rod lens, or any other similar component, homogenizes the illuminance distribution of the light to be incident on the light modulator 3.

The controller 4 includes an interface 41, a timing generating circuit 42, and an image processing circuit 43. The interface 41 receives an electric signal $D_0$ corresponding to an input image from a signal source 9, such as a DVD player or a computer, and separates the electric signal $D_0$ into a sync signal $D_1$ and an image signal $D_2$. The sync signal $D_1$ contains data representing image display conditions, such as the rate at which the input image is refreshed. The image signal $D_2$ contains grayscale data for each pixel. The thus separated sync signal $D_1$ is outputted to the timing generating circuit 42. The thus separated image signal $D_2$ is outputted to the image processing circuit 43.

The ratio (hereinafter referred to as a duty) of the period during which the first image B1 is displayed (hereinafter referred to as a first display period) to the period during which the second image B2 is displayed (hereinafter referred to as a second display period) is set in advance at a variable or a fixed value. The duty is set, for example, in accordance with the speed at which the light modulator 3 responds. When the duty approaches 1, the speed at which the light modulator 3 is required to respond decreases, whereby the cost of the light modulator 3 can be reduced.

The duty is set also in accordance with, for example, the visual angle sensitivity for the light L1 and L2 (optical absorptance of the human pyramidal cells). To allow the viewer to recognize the images B1 and B2 to be substantially the same in brightness, the duty may be set in such a way that the optical energy to be absorbed by the human pyramidal cells during the first display period is equal to the optical energy to be absorbed by the human pyramidal cells during the second display period based on the difference in optical absorptance of the pyramidal cells between the first and second wavelengths.

The timing generating circuit 42 generates a timing signal $D_3$ representing the first and second display periods based on the thus set duty and the refresh rate of the input image. The timing signal $D_3$ is outputted to the driver 21 and the image processing circuit 43.

In the example shown in FIG. 4, the duty is set at 1, and the first display period and the second display period are set not to overlap with each other. The length of the single-frame display period is determined by the sync signal $D_1$.

For example, when the refresh rate is 60 Hz and any single frame does not include a period during which no image is displayed (hereinafter referred to as a non-display period), the length of the single-frame display period ($t_N$ to $t_{N+1}$, N=0, 1, 2, and so on) is 1/60 second. The length of the first display period is 1/120 seconds, and the length of the second display period is 1/120 seconds.

The time at which the first display period starts ($t_0$ in FIG. 4, for example) is shifted from the time at which the second display period starts ($t_{0.5}$ in FIG. 4, for example) by approximately one-half the length of the single-frame display period (1/120 second). The timing signal $D_3$ contains data representing the time at which the first display period starts and the time at which the second display period starts.

The driver 21 keeps turning on the first solid-state light sources 22 and turning off the second solid-state light sources 23 during the first display period determined by the timing signal $D_3$. The driver 21 keeps turning off the first solid-state light sources 22 and turning on the second solid-state light sources 23 during the second display period determined by the timing signal $D_3$.

The image processing circuit 43 not only performs a variety of image processing operations, such as gamma correction, on the image signal $D_2$ but also processes the image signal $D_2$ so that the number of pixels of the image signal $D_2$ matches that of the light modulator 3. For example, when the number of pixels of the image signal $D_2$ is greater than that of the light modulator 3, an image signal having pixels that matches that of the light modulator 3 is generated by averaging data on grayscale of each set of pixels contained in the image signal $D_2$ into data on grayscale of a single pixel.

The image processing circuit 43 generates a first modulation signal $D_4$ for the first image 31 and a second modulation signal $D_5$ for the second image B2 based on the image signal $D_2$. The image processing circuit 43 supplies the first modulation signal $D_4$ to the light modulator 3 in synchronization with the timing at which the display of the first image B1 starts, which is determined by the timing signal $D_3$. The image processing circuit 43 supplies the second modulation signal $D_5$ to the light modulator 3 in synchronization with the timing at which the display of the second image B2 starts, which is determined by the timing signal $D_3$.

While the first solid-state light sources 22 are kept turned on during the first display period, the light L1 is incident on the light modulator 3 during the first display period. The light modulator 3 receives the first modulation signal $D_4$ during the first display period and modulates the light L1 to form the first image B1. Similarly, while the second solid-state light sources 23 are kept turned on during the second display period, the light L2 is incident on the light modulator 3 during the second display period, and the light modulator 3 modulates the light L2 based on the second modulation signal $D_5$ to form the second image B2.

Figure 5:
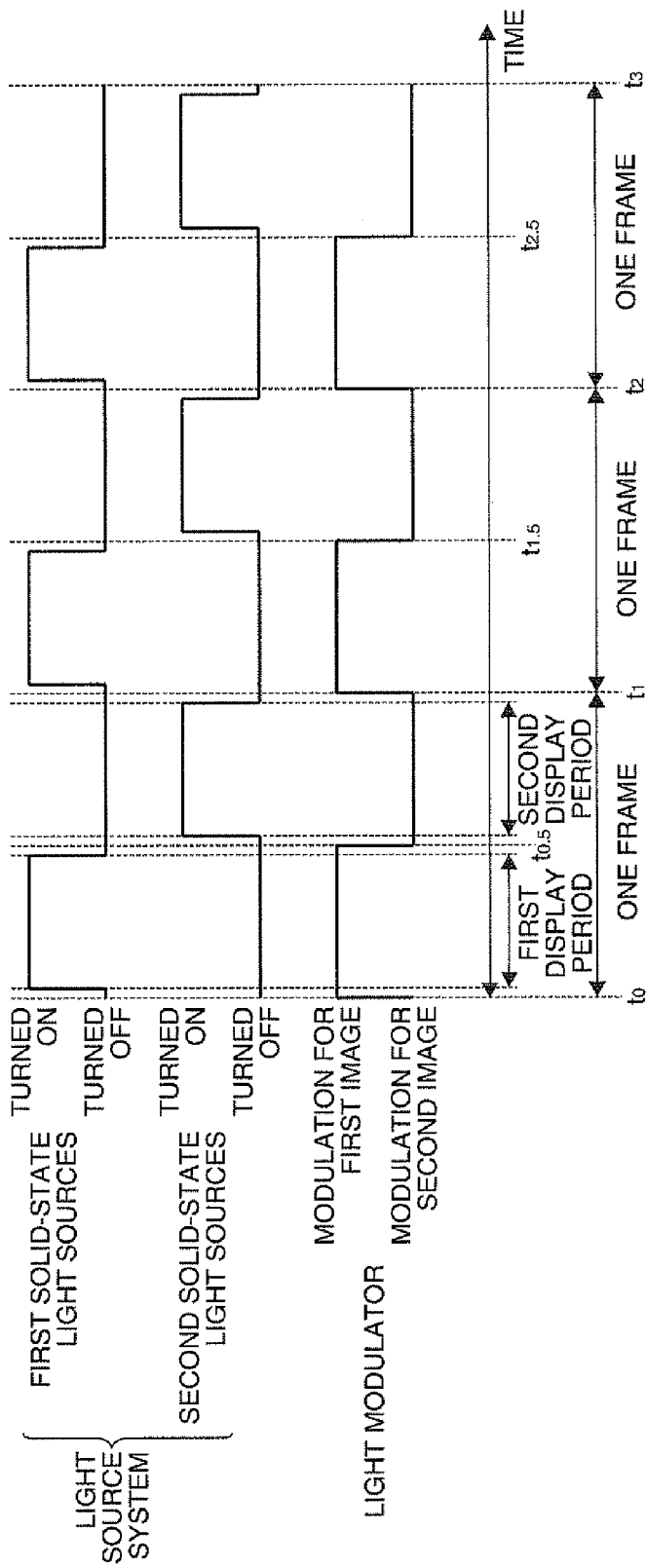
FIG. 5 is a chart showing an example of the operation timing different from that shown in FIG. 4.

FIG. 5 is a timing chart showing the operation timing different from that in the example shown in FIG. 4. In the example shown in FIG. 5, each single frame includes a non-display period. In this case, the timing generating circuit 42 subtracts the length of the non-display period in a single frame from the total length of the single frame to determine the length of the display period in the single frame and determines the lengths of the first and second display periods based on the length of the display period in the single frame and the duty. The timing generating circuit 42 generates the timing signal $D_3$ by setting the non-display period in such a way that the period between the first and second display periods forms the non-display period and the non-display period contains the time at which the operation of the light modulator 3 is switched from the modulation for the first image to the modulation for the second image ($t_{0.5}$, for example). The driver 21 keeps the first solid-state light sources 22 turned off during the second display period and the non-display period and the second solid-state light sources 23 turned off during the first display period and the non-display period.

The speed at which the light modulator 3 responds is limited depending on the type of light modulator (liquid crystal light valve, for example). With a non-display period provided between the first and second display periods, the solid-state light sources 22 and 23 are kept turned off during the transition period when the modulation for the first image is switched to the modulation for the second image. In this way, image quality will not be degraded even when the light modulator 3 does not respond fast enough to the switching between the light L1 and the light L2.

A description will be made of a method for generating the modulation signals $D_4$ and $D_5$ with reference to FIGS. 6 to 8.

Figure 6:
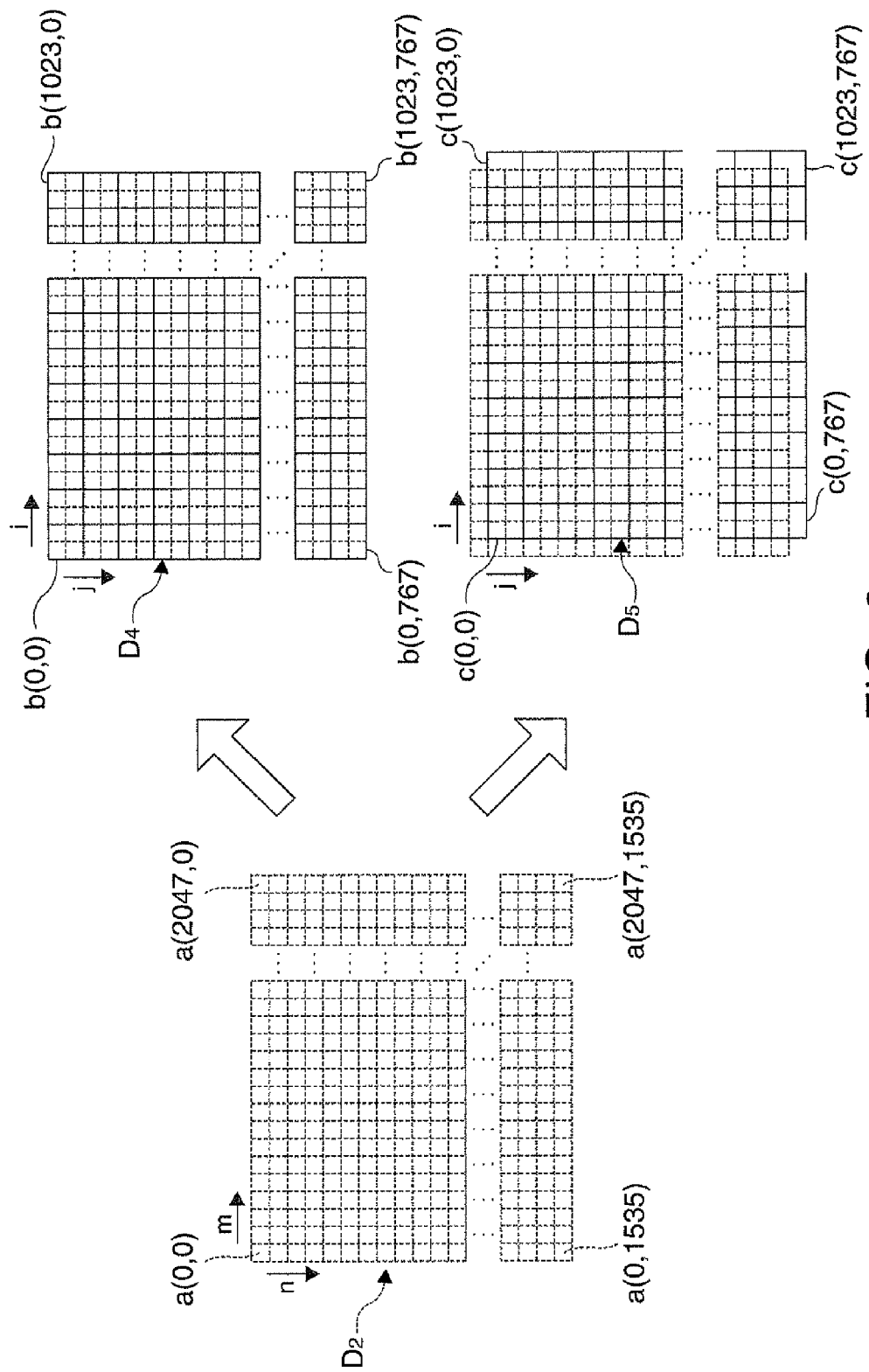
FIG. 6 is a conceptual diagram showing an example of a method for generating a modulation signal.
Figure 7:
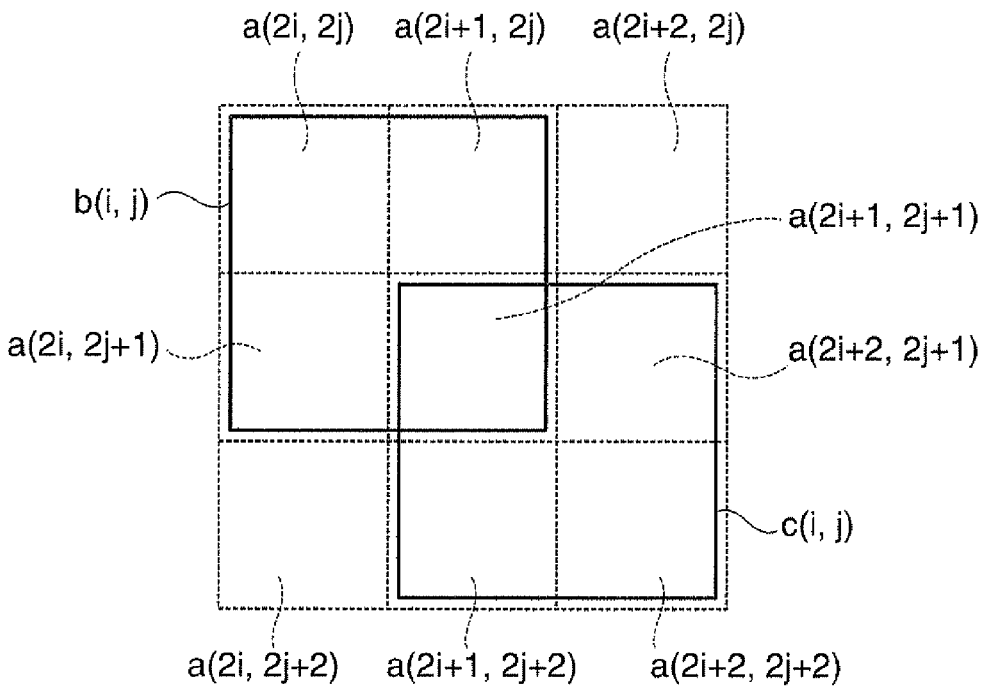
FIG. 7 shows enlarged pixels to describe the method for generating a modulation signal.
Figure 8:
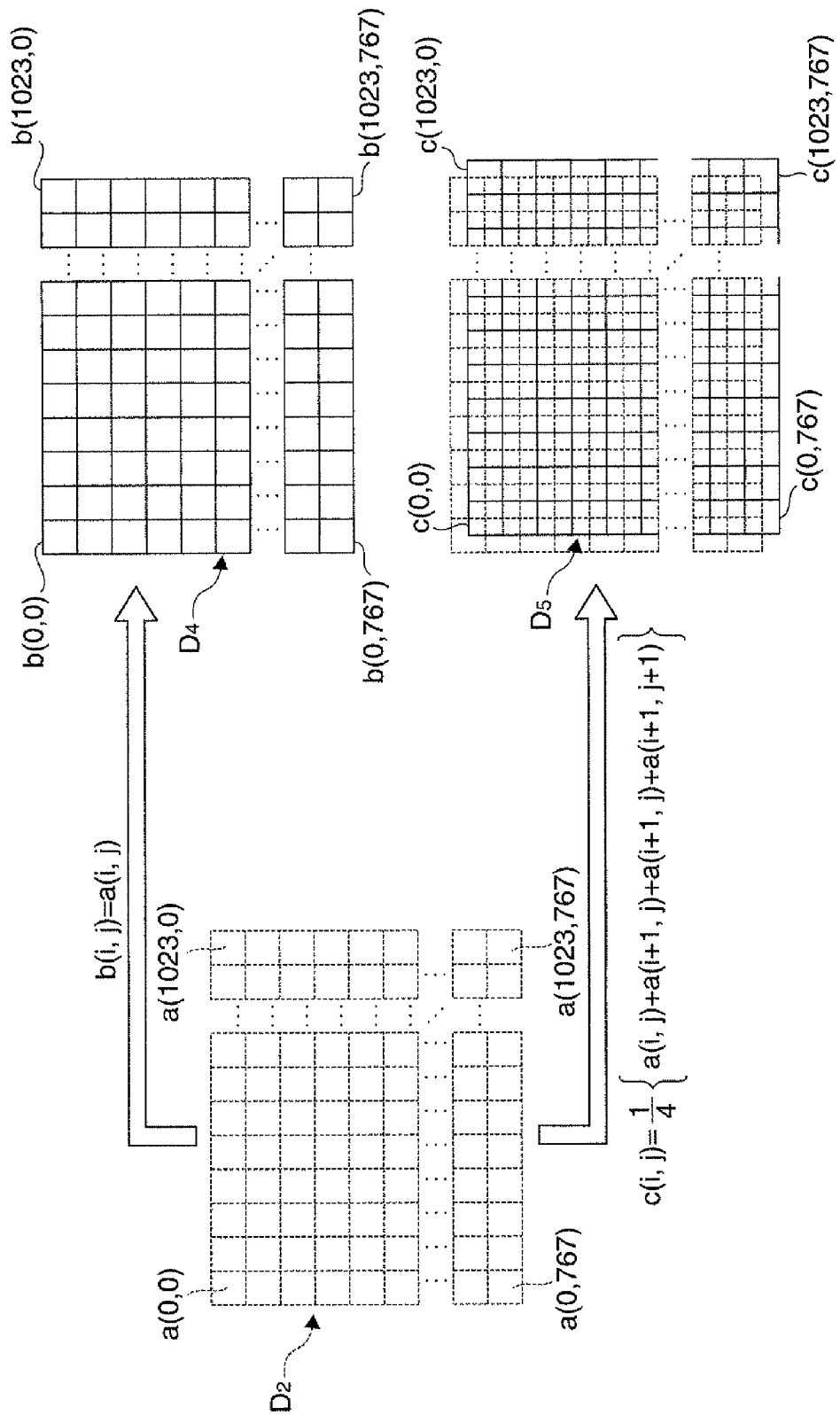
FIG. 8 is a conceptual diagram showing an example of a method for generating a modulation signal different from the method shown in FIGS. 6 and 7.

FIGS. 6 and 7 describe a first method for generating the modulation signals $D_4$ and $D_5$, and FIG. 8 describes a second method for generating the modulation signals $D_4$ and $D_5$. The first generation method is used in a case where the number of pixels of an input image is greater than the number of pixels of the light modulator 3. The second generation method is used in a case where the number of pixels of the light modulator 3 is equal to the number of pixels of an input image.

In the description of the first generation method, it is assumed that the number of pixels of the image signal $D_2$ is 2048×1536 (QXGA) and the number of pixels of the light modulator 3 is 1024×768 (XGA) for ease of description. As shown in FIG. 6, let a(m, n) be the grayscale value of the pixel having an address (m, n) and contained in the image signal $D_2$, where m is an integer greater than or equal to 0 but smaller than or equal to 2047 and n is an integer greater than or equal to 0 but smaller than or equal to 1535. Further, let b(i, j) be the grayscale value of the pixel having an address (i, j) and contained in the first modulation signal $D_4$, and let c(i, j) be the grayscale value of the pixel having the address (i, j) and contained in the second modulation signal $D_5$, where i is an integer greater than or equal to 0 but smaller than or equal to 1023 and j is an integer greater than or equal to 0 but smaller than or equal to 767.

Based on the grayscale values of the input image pixels contained in each pixel P1, the image processing circuit 43 calculates the grayscale value of the pixel P1. In this description, the range of the first image B1 coincides with the range of the input image, and each pixel P1 contains a 2×2 array of pixels in the input image. As shown in FIG. 7, the image processing circuit 43 averages grayscale values of four input image pixels contained in the pixel of the first image B1 having an address (i, j), which are a(2i, 2j), a(2i+1, 2j), a(2i, 2j+1), and a(2i+1, 2j+1), and substitutes the average into b(i, j).

Similarly, based on the grayscale values of the input image pixels contained in each pixel P2 of the second image B2, the image processing circuit 43 calculates the grayscale value of the pixel P2. The input image pixels contained in each pixel P2 are determined by the amount of shift of the second image B2 relative to the first image B1. The amount of shift is determined by the positional relationship between the members in the optical path adjustment system 5 (which will be described later).

Now, let ΔW be the amount of shift, p be the size of each of the pixels in the light modulator 3, N be an integer including 0, and q be a decimal greater than 0 but smaller than 1. ΔW is expressed by the following equation (1):

$$\Delta W = p(N+q) \quad (1)$$

In the equation (1), q represents the amount of shift of each pixel P2 from the corresponding pixel P1. For example, when the position of each pixel P2 is shifted from the position of the corresponding pixel P1 by one-half the pixel size, q is equal to 0.5. When the amount of shift of the image B2 from the image B1 is 1.5 times the pixel size, N is equal to 1 and p is equal to 0.5, and the amount of shift of each pixel P2 from the corresponding pixel P1 is also one-half the pixel size.

As shown in FIG. 2B, when q is set in such a way that each pixel P1 overlaps with a plurality of pixels P2, the gap between the pixels P1 can be filled with the pixels P2 and the gap between the pixels P2 can be filled with the pixels P1, whereby the resolution can be effectively increased. In particular, when q is set at a value greater than or equal to 0.25 but smaller than or equal to 0.75, the degree of increase in resolution is high, and when q is set at 0.5, the effective resolution is maximized. When the pixels are arranged in a two-dimensional manner, shifting the pixels in at least one of the arrangement directions allows the resolution to be increased. Shifting the pixels in both the two arrangement directions allows the resolution to be further increased.

In the example shown in FIG. 6, the amount of pixel shift ΔWi in the i direction (horizontal scan direction, for example) is one-half the pixel size, and the amount of pixel shift ΔWj in the j direction (vertical scan direction, for example) is one-half the pixel size. As shown in FIG. 7, the image processing circuit 43 averages grayscale values of four input image pixels contained in the pixel of the second image B2 having the address (i, j), which are a(2i+1, 2j+1), a(2i+2, 2j+1), a(2i+1, 2j+2), and a(2i+2, 2j+2), and substitutes the average into c(i, j).

When the contour of a pixel P2 runs off the contour of the corresponding pixels of the input image, the amount of pixel shift can, for example, be one-quarter the pixel size. In this case, c(i, j) may be determined, for example, by using an interpolation process used to make the number of pixels of the input image equal to the number of pixels of the light modulator. For example, c(i, j) can be determined by performing weighting in proportional to the reciprocal of the distance from the center of the pixel P2 to the center of each of the input image pixels contained in the pixel P2.

Pixels of the second image B2 can be located outside the input image. In this case, the pixels of the second image B2 that are located outside the input image may be displayed in black. Further, each of c(1023, 0) to c(1023, 766) shown in FIG. 6, for example, may have the average of the grayscale values of two input image pixels contained in the corresponding pixel P2 or a black grayscale value.

In the description of the second generation method, it is assumed that the number of pixels of the image signal $D_2$ is 1024×768 (XGA) and the number of pixels of the light modulator 3 is 1024×768 (XGA) for ease of description. The image processing circuit 43 substitutes a(i, j), which is the grayscale value of the pixel of the input image having an address (i, j), into b(i, j), which is the grayscale value of the pixel of the first image B1 having the address (i, j). The image processing circuit 43 averages grayscale values of four input image pixels with which part of the pixel of the second image B2 having the address (i, j) overlaps, which are a(i, j), a(i+1, j), a(i, j+1), and a(i+1, j+1), and substitutes the average into c(i, j).

Figure 9A:
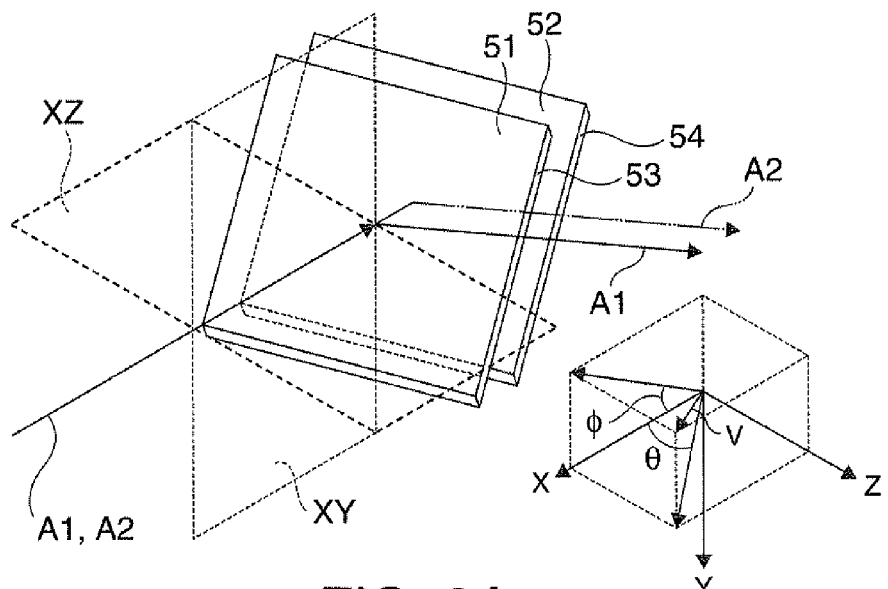
FIG. 9A is a perspective view showing the configuration of an optical path adjustment system.
Figure 9B:
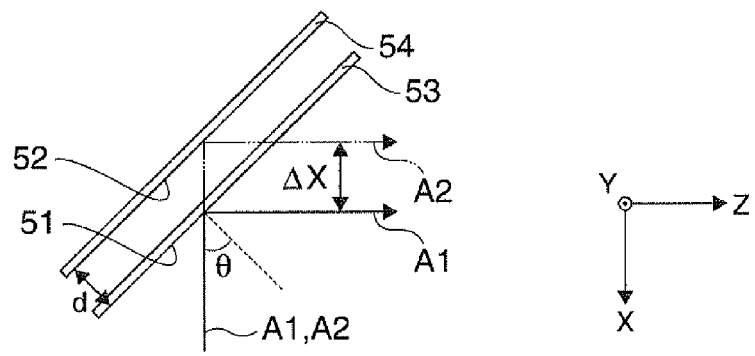
FIG. 9B is a projection onto an XZ plane showing the light traveling via the optical path adjustment system.
Figure 9C:
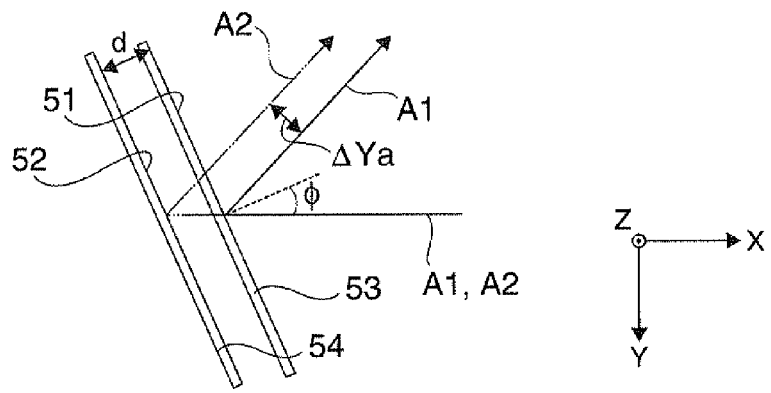
FIG. 9C is a projection onto an XY plane showing the light traveling via the optical path adjustment system.
Figure 10:
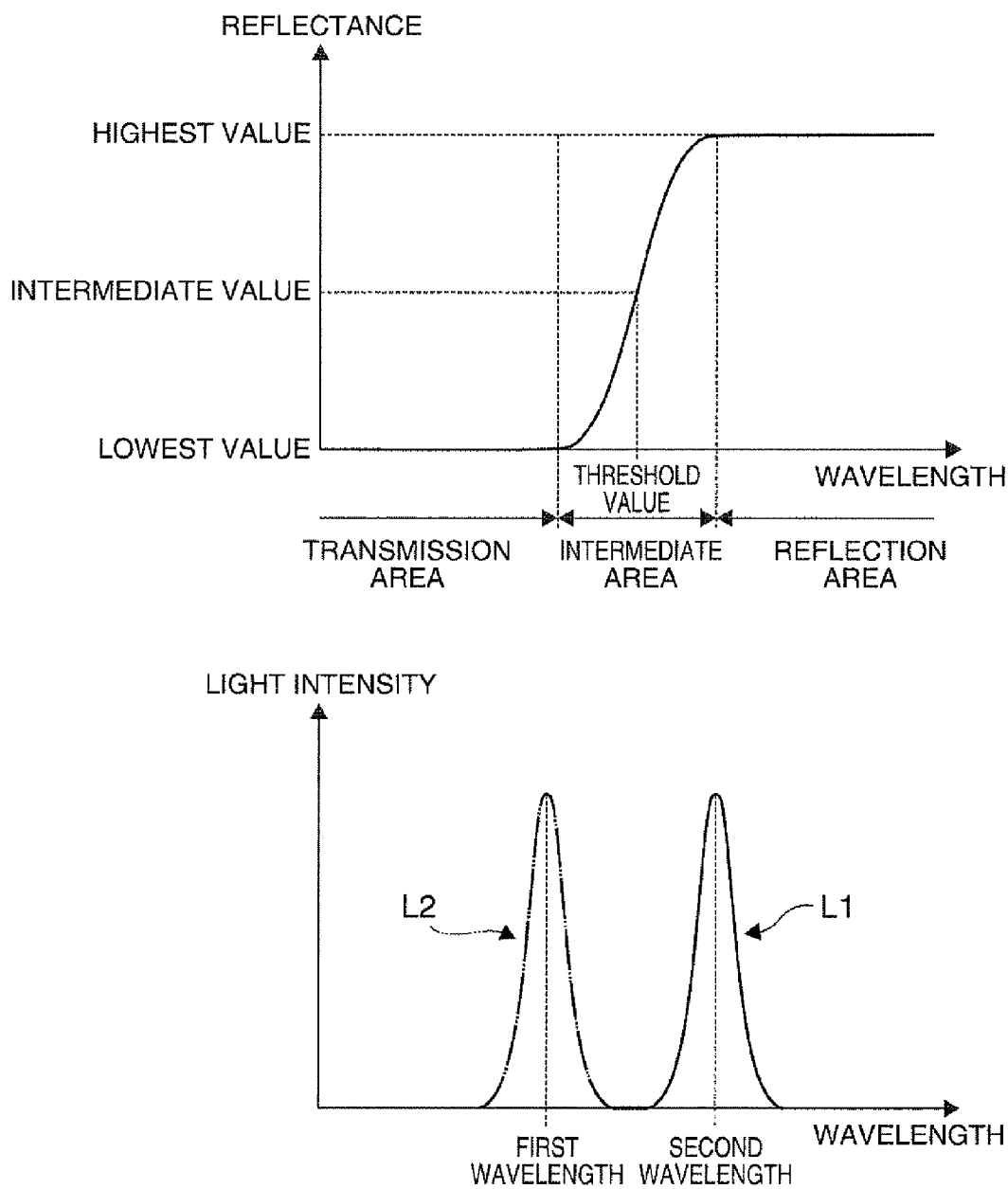
FIG. 10 shows graphs illustrating the characteristics of a wavelength selecting surface versus first and second wavelengths.

The optical path adjustment system 5 will now be described with reference to FIGS. 9A, 9B, 9C, and 10. FIG. 9A is a perspective view diagrammatically showing the configuration of the optical path adjustment system 5. FIG. 9B is a plan view projected onto the XZ plane and showing the optical path A1 of the light L1 and the optical path A2 of the light L2 incident on the optical path adjustment system 5. FIG. 9C is a plan view projected onto the XY plane and showing the optical paths A1 and A2. FIG. 10 shows graphs illustrating the reflection characteristics of the wavelength selecting surface 51 versus the spectrum of the light L1 and L2. In the XYZ orthogonal coordinate system shown in FIGS. 9A to 9C, the X axis corresponds to the optical paths A1 and A2 of the light L1 and the light L2 before they are incident on the optical path adjustment system 5. The Y axis corresponds, for example, to the i direction shown in FIG. 6 in the pixel arrangement of the light modulator 3, and the Z axis corresponds, for example, to the j direction.

As shown in FIGS. 9A to 9C, the optical path adjustment system 5 includes a wavelength selecting element 53 and a reflection mirror 54. The wavelength selecting element 53 is formed, for example, of a dichroic mirror and has the wavelength selecting surface 51. The reflection mirror 54 is formed, for example, of a dichroic mirror or a reflection mirror having a reflection film formed thereon and has the reflection surface 52. The reflection surface 52 is positioned to be substantially parallel to the wavelength selecting surface 51. The reflection mirror 54 in the present embodiment is an element formed separately from the wavelength selecting element 53 and fixed thereto. The direction V of a normal to the wavelength selecting surface 51 is inclined to the X axis by θ [rad] when the normal is projected on the XZ plane and inclined to the X axis by φ [rad] when the normal is projected onto the XY plane.

As shown in FIG. 10, the wavelength selecting surface 51 transmits light having relatively short wavelengths in the visible light range (hereinafter referred to as a transmission area) and reflects light having relatively long wavelengths in the visible light range (hereinafter referred to as a reflection area). The reflectance of the wavelength selecting surface 51 is saturated to the lowest value in the transmission area and saturated to the highest value in the reflection area. In an intermediate area between the transmission area and the reflection area, the reflectance of the wavelength selecting surface 51 monotonously increases as the wavelength of the incident light increases.

To separate the light L1 and L2 at the wavelength selecting surface 51 with high precision, it is effective to narrow the width of the intermediate area or narrow the spectral bandwidth of the light L1 and L2. When the wavelength selecting surface 51 is formed of a dichroic mirror, increasing the number of layers of a multilayer film contained in the dichroic mirror narrows the width of the intermediate area. Further, using LDs as the solid-state light sources 22 and 23 narrows the spectral bandwidth of the light L1 and L2.

The reflection surface may be formed, for example, of a dichroic mirror, as in the case of the wavelength selecting surface 51. In this configuration, when part of the light L1 passes through the wavelength selecting surface 51 and forms leakage light, part of the leakage light passes through the reflection surface. The leakage light having passed through the reflection surface is removed from the optical path between the optical path adjustment system and the projection system 6. As a result, an unwanted image formed by the leakage light is less visible, which avoids decrease in image quality due to the leakage light.

In the description, the average of the highest and lowest reflectance values in the visible light range is referred to as an intermediate value, and the wavelength at which the reflectance has the intermediate value is referred to as a threshold value. When the wavelength of the light incident on the wavelength selecting surface 51 is greater than the threshold value, reflection of the incident light off the wavelength selecting surface 51 dominates, whereas when the wavelength of the incident light is smaller than the threshold value, transmission of the incident light through the wavelength selecting surface 51 dominates.

In the present embodiment, the first wavelength is set to be greater than the threshold value, and the second wavelength is set to be smaller than the threshold value. Setting the wavelength bandwidth of the light L2 not to overlap with the wavelength bandwidth of the light L1 allows the light L1 and the light L2 to be separated at the wavelength selecting surface 51 with high precision, which is advantageous in improving the image quality. It is, however, noted that even when part of the wavelength bandwidth of the light L2 overlaps with the wavelength bandwidth of the light L1, the resolution of a displayed image can still be increased.

In FIG. 10, the light L1 and the light L2 have the same maximum light intensity, but the light intensities of the light L1 and L2 may alternatively differ from each other. For example, when the visual angle sensitivity described above for the first wavelength differs from that for the second wavelength, the outputs from the solid-state light sources 22 and 23 may be set to differ from each other in such a way that the amounts of optical energy to be absorbed by the human pyramidal cells during the first and second display periods, provided that pixels having the same grayscale are displayed, are substantially the same. In this way, the viewer recognizes images B1 and B2 to be substantially the same in brightness and hence the switching between the images B1 and B2 is unlikely visible, whereby the image quality can be improved.

The light L1 incident on the optical path adjustment system 5 is reflected on the wavelength selecting surface 51 and travels toward the projection system 6. The light L2 incident on the optical path adjustment system 5 passes through the wavelength selecting surface 51, is incident on the reflection surface 52 and reflected on the reflection surface 52, passes through the wavelength selecting surface 51 again, and travels in substantially the same direction as the light L1. To achieve the situation in which the optical path A1 of the light L1 and the optical path A2 of the light L2 immediately before they are incident on the projection system 6 are shifted from each other in a direction substantially perpendicular to the optical axis of the projection system 6, the optical paths of the light fluxes that exit out of the optical path adjustment system 5 are adjusted in accordance with the wavelength of the light fluxes.

As shown in FIG. 9B, after the light L2 exits out of the optical path adjustment system 5, the optical path A2 of the light L2 is shifted from the optical path A1 of the light L1 and substantially in parallel thereto by ΔX in the X direction. As shown in FIG. 9C, after the light L2 exits out of the optical path adjustment system 5, the optical path A2 of the light L2 is shifted from the optical path A1 of the light L1 and substantially in parallel thereto by ΔYa in the Y direction. ΔX and ΔYa are expressed by the following equations (2) and (3), where d is the distance between the wavelength selecting surface 51 and the reflection surface 52. As seen from the equations (2) and (3), ΔX and ΔYa, which are the amounts of shift, are determined by the distance (d) between the wavelength selecting surface 51 and the reflection surface 52 and the angle of incidence (θ, φ) on the wavelength selecting surface 51.

$$\Delta X = 2d \times \sin\theta \qquad (2)$$

$$\Delta Ya = 2d \times \sin\phi \qquad (3)$$

According to the thus configured projector 1, the displayed images B1 and B2 are temporally and spatially shifted from each other, and the number of pixels of a single image into which the images B1 and B2 are combined is greater than the number of pixels of the light modulator 3. As a result, a high-resolution image can be displayed without any increase in the number of pixels of the light modulator 3, and an image display apparatus capable of displaying a high-quality image can be provided at a low cost.

Further, the optical paths A1 and A2 of the light L1 and L2 having exited out of the optical path adjustment system 5 can be shifted from each other without dynamic control of the optical path adjustment system 5. Since it is not necessary to spatially move the optical path adjustment system 5, the optical path adjustment system 5 will not vibrate. As a result, the angles of incidence of the light L1 and L2 on the optical path adjustment system 5 can be controlled with high precision, whereby the amount of shift of the image B2 from the image B1 will not vary. Since the optical path adjustment system 5 will not vibrate, the components of the apparatus will unlikely suffer from vibration-induced defects, and no inconvenience, such as increase in frequency of maintenance of the apparatus and decrease in lifetime of the apparatus, will occur.

Since it is not necessary to electrically change the refractive index or other characteristics of the optical path adjustment system 5, no drive voltage is required for the optical path adjustment system 5. Since the light source system 2 can be driven by a typical drive voltage, the drive voltage required for the entire apparatus will not increase.

Since the light source in the light source system 2 is formed of the solid-state light sources 22 and 23, the state of the light source can be instantaneously switched between on and off in an electrical manner, whereby the first image B1 and the second image B2 can be switched at precise timing. Therefore, a transition period required for the switching between the images B1 and B2 can be minimized, and the image quality will not be degraded because the switching between the images will not be recognized.

The configuration described with reference to the first embodiment is an example showing an aspect of the invention, and the technical scope of the invention is not limited to the first embodiment. A variety of changes can be made to the extent that they do not depart from the substance of the invention. For example, the first wavelength is longer than the second wavelength in the first embodiment for ease of description, but the first wavelength may alternatively be shorter than the second wavelength. Variations of the light source system, the light modulator, and the optical path adjustment system will be described below.

Figure 11A:
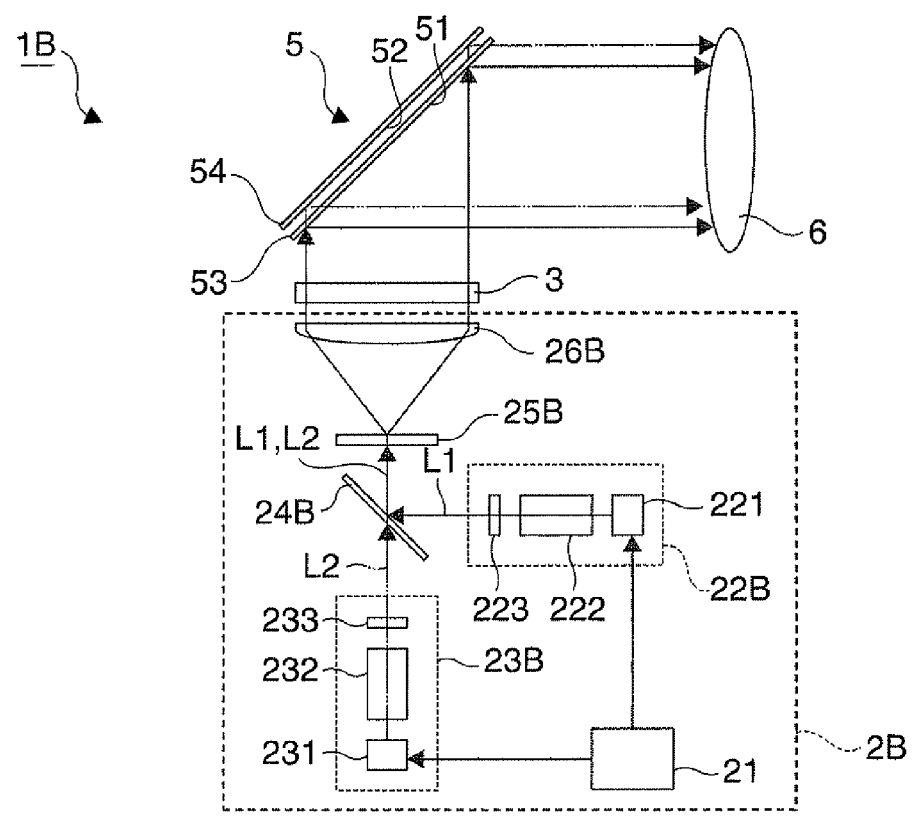
FIGS. 11A and 11B are schematic views showing the configurations of first and second variations.

FIG. 11A is a schematic view showing the configuration of a projector 1B of a first variation. The configuration of a light source system 2B in the projector 1B differs from that in the first embodiment. As shown in FIG. 11A, the light source system 2B includes a first laser light source 22B, a second laser light source 23B, a wavelength selecting element 24B, a light diffusing element 25B, and a parallelizing element 26B.

The first laser light source 22B in the present variation includes a first solid-state light source 221, a wavelength conversion element 222, and a resonance mirror 223. The first solid-state light source 221 emits light having a fundamental wavelength (infrared light, for example). The wavelength conversion element 222 is made, for example, of a lithium niobate crystal having a periodically poled structure and converts at least part of the incident light into light having a converted wavelength (green light, for example). The resonance mirror 223 is characterized by reflecting the light having the fundamental wavelength and transmitting the light having the converted wavelength.

The light emitted from the first solid-state light source 221 travels back and forth multiple times between the first solid-state light source 221 and the resonance mirror 223 for laser oscillation. Part of the light emitted from the first solid-state light source 221 is converted into the light having the converted wavelength whenever passing through the wavelength conversion element 222. The laser light whose wavelength has been converted by the wavelength conversion element 222 passes through the resonance mirror 223 and exits out of the laser light source 22B as light L1 having a first wavelength.

The second laser light source 23B, having the same configuration as that of the first laser light source 22B, includes a second solid-state light source 231, a wavelength conversion element 232, and a resonance mirror 233. In the second laser light source 23B, the wavelength of the light emitted from the second solid-state light source 231 differs from the wavelength of the light emitted from the first solid-state light source 221. The wavelength conversion element 232 has conversion characteristics corresponding to the wavelength of the light emitted from the second solid-state light source 231. The resonance mirror 233 has reflection/transmission characteristics corresponding to the wavelength of the light emitted from the second solid-state light source 231. The second laser light source 23B emits light L2 having a second wavelength.

When the wavelengths directly produced in the laser devices are used as the first and second wavelengths, the wavelength conversion elements can be omitted. Alternatively, an intra-cavity laser device may be used.

The wavelength selecting element 24B is characterized by reflecting the light L1 having the first wavelength and transmitting the light having the second wavelength. The wavelength selecting element 24B is formed, for example, of a dichroic mirror and in the present variation, has substantially the same characteristics as those of the wavelength selecting element 53 in the optical path adjustment system 5. The light L2 incident on the wavelength selecting element 24B passes through the wavelength selecting element 24B and impinges on the light diffusing element 25B. The light L1 incident on the wavelength selecting element 24B is reflected on the wavelength selection element 24B, where the traveling direction of the light L1 is deflected and substantially coincides with the optical path of the light L2, and incident on the light diffusing element 25B. Part of the light L1 that will pass through the wavelength selection element 53 and form leakage light passes through the wavelength selecting element 24B. In this way, the leakage light is removed from the optical path between the wavelength selecting element 24B and the light diffusing element 25B, whereby the amount of leakage light in the optical path adjustment system 5 is reduced.

The light diffusing element 25B is formed, for example, of a VHG or any other optical grating or a diffuser and diffuses the light L1 and the light L2 before they exit therethrough. The light diffusing element 25B, which is formed of a diffractive optical element in the present variation, not only diffuses the light L1 and L2 but also changes the spot shapes of the light L1 and L2. The light L1 and the light L2 having exited out of the light diffusing element 25B are incident on the light modulator 3, where the spot shapes of the light L1 and L2 are substantially similar to the area where a plurality of pixels are arranged (rectangular area, for example). The light L1 and L2 having exited out of the light diffusing element 25B passes through the parallelizing element 26B formed, for example, of a field lens, where the light L1 and L2 are substantially parallelized, and impinges on the light modulator 3. Thereafter, a first image B1 formed by the light L1 is displayed and a second image B2 formed by the light L2 is displayed, as in the first embodiment.

In the projector 1B, since each of the light L1 and the light L2 is laser light, the spectral bandwidth thereof is significantly narrower than that of the light emitted from an LED or other similar light sources. It is therefore readily possible to prevent the light intensity-versus-wavelength distribution of the light L1 from overlapping with that of the light L2, whereby the light L1 and the light L2 are readily separated at the wavelength selecting surface 51.

Since part of the light that will form leakage light in the optical path adjustment system 5 is removed by the wavelength selecting element 24B, an unwanted image produced by the leakage light is less visible. Even when the laser light sources 22B and 23B are replaced with LEDs or other similar light sources, the advantageous effect of making an unwanted image produced by leakage light less visible can be provided. A light source system formed of both an LED and an LD may alternatively be used. For example, the first solid-state light source may be formed of an LED, and the second solid-state light source may be formed of an LD.

Figure 11B:
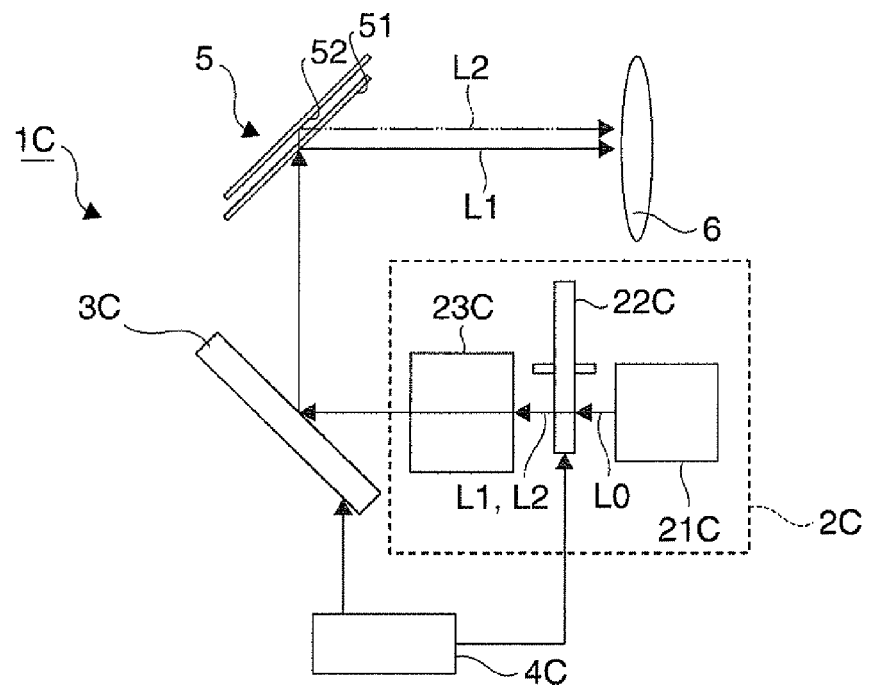

FIG. 11B is a schematic view showing the configuration of a projector 1C of a second variation. As shown in FIG. 11B, the projector 1C includes a light source system 2C, a light modulator 3C, a controller 4C, the optical path adjustment system 5, and the projection system 6.

The light source system 2C includes a lamp light source 21C, a color wheel 22C, and an illuminance homogenizing element 23C. The lamp light source 21C emits light L0 having first and second wavelengths. The color wheel 22C is, for example, a plate having a substantially circular shape and installed in a rotatable manner. The color wheel 22C includes first and second color filters. The first color filter transmits light having the first wavelength and absorbs light having the second wavelength. The second color filter absorbs light having the first wavelength and transmits light having the second wavelength. As the color wheel 22C rotates, light L1 having the first wavelength and light L2 having the second wavelength are switched with time to exit through the color wheel 22C.

The light L1 and the light L2 having exited through the color wheel 22C are incident on the illuminance homogenizing element 23C, where the illuminance thereof is homogenized, and then incident on the light modulator 3C. The light modulator 3C is formed of a digital mirror device having a mirror provided for each pixel. The controller 4C monitors the rotation of the color wheel 22C and outputs first and second modulation signals to the light modulator 3C switched with time in synchronization with the rotation of the color wheel 22C. The light modulator 3C controls the orientation of the mirror for each pixel in accordance with the first and second modulation signals to control the direction in which the incident light is reflected for each pixel. The light L1 and the light L2 having exited out of the light modulator 3C travel via the optical path adjustment system 5 and the projection system 6 and are displayed as first and second images on a projection surface, as in the first embodiment.

In the projector 1C, since the wavelength of the light emitted from the light source system 2C is temporally switched, the configuration of the light source system 2C can be simplified. The color wheel 22C may vibrate when rotated, but the effect of the vibration of the color wheel 22C on the optical paths of the light L1 and L2 is significantly smaller than the effect in a case where the optical path adjustment system 5 vibrates. Therefore, the amount of shift by which optical paths are shifted from each other can be set more precisely than in a configuration in which the optical path adjustment system itself is spatially moved, and decrease in image quality due to vibration will not occur.

Figure 12A:
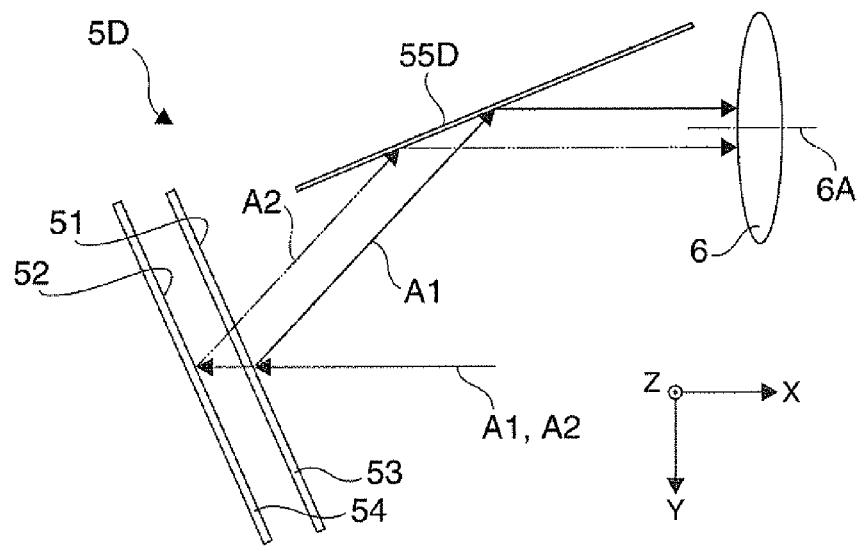
FIGS. 12A to 12C are schematic views showing the configurations of third to fifth variations.

FIG. 12A is a side view showing the configuration of an optical path adjustment system 5D of a third variation. The optical path adjustment system 5D differs from the optical path adjustment system 5 shown in FIG. 9C in that a guide 55D formed, for example, of a reflection mirror is provided. The guide 55D reflects the light L1 and the light L2 having traveled via the wavelength selecting surface 51 toward the projection system 6.

The angle between the direction in which the light L1 and L2 travels and a projector body changes after the light L1 and the light L2 are incident on the wavelength selecting surface 51 or the reflection surface and travel therethrough. The position and the attitude of the guide 55D is set in such a way that the angle between the direction in which the light L1 and L2 travels and the projector body does not change before and after the incidence of the light L1 and L2 on the optical path adjustment system 5D.

In the present variation, the position and the attitude of the guide 55D is set in such a way that the direction in which the light L1 and L2 having exited out of the optical path adjustment system 5D travels is substantially parallel to the optical axis 6A of the projection system 6. In this way, the angle between the direction in which the light L1 and L2 travels and the horizontal plane or any other plane does not change before and after the incidence of the light L1 and L2 on the optical path adjustment system 5D, whereby the descending vertical angle or the ascending vertical angle of the light L1 and L2 that exits out of the projector can be readily controlled.

Figure 12B:
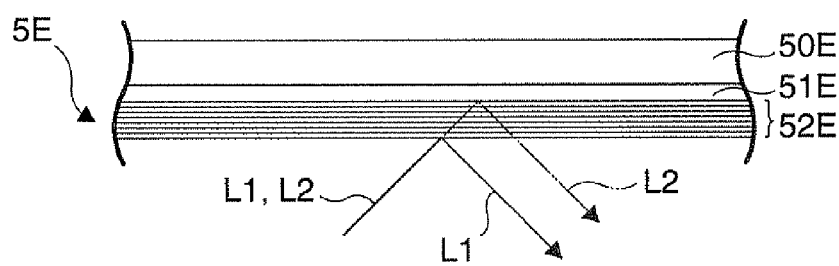

FIG. 12B is a schematic view showing the configuration of an optical path adjustment system 5E of a fourth variation. The optical path adjustment system 5E includes a substrate 50E, and a reflection film 51E and a dielectric multilayer film 52E stacked on the substrate 50E. The dielectric multilayer film 52E has a structure in which two types of layer having different refractive indices are alternately stacked. The refractive index and the thickness of each of the layers that form the dielectric multilayer film 52E are adjusted in such a way that the dielectric multilayer film 52E reflects light L1 having a first wavelength and transmits light L2 having a second wavelength. The front surface of the reflection film 51E functions as a reflection surface, and the front surface of the dielectric multilayer film 52E functions as a wavelength selecting surface. In the thus configured optical path adjustment system 5E, the reflection surface is formed on the same optical element on which the wavelength selecting surface is formed.

In the optical path adjustment system 5E, the distance between the reflection surface and the wavelength selecting surface is determined by the thickness of the dielectric multilayer film 52E. The distance between the reflection surface and the wavelength selecting surface can therefore be controlled with high precision. The distance can, for example, be controlled with pixel-size precision (with micrometer precision, for example). Further, since the reflection surface is formed on the same optical element on which the wavelength selecting surface is formed, the distance between the reflection surface and the wavelength selecting surface unlikely changes over time, and hence the amount of shift of the optical path of the light L2 from the optical path of the light L1 unlikely changes over time.

Alternatively, the reflection surface and the wavelength selecting surface may be formed on the same optical element by forming the reflection surface on one side of a transparent glass substrate or any other suitable substrate and forming the wavelength selecting surface on the other side. In this case, the distance between the reflection surface and the wavelength selecting surface can readily be increased, as compared with the case where the distance between the reflection surface and the wavelength selecting surface is set depending only on the thickness of the dielectric multilayer film.

Figure 12C:
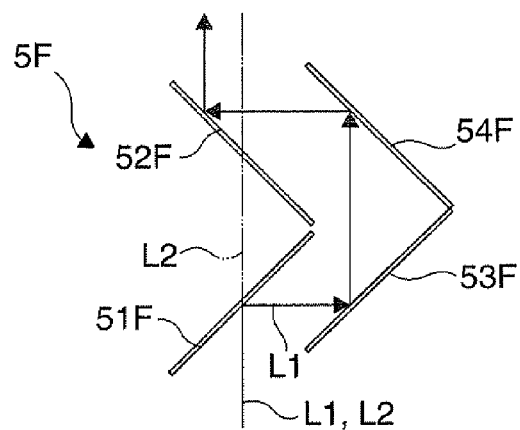

FIG. 12C is a schematic view showing the configuration of an optical path adjustment system 5F of a fifth variation. The optical path adjustment system 5F includes wavelength selecting elements 51F and 52F and reflection mirrors 53F and 54F. Each of the wavelength selecting elements 51F and 52F has the same characteristics as those of the wavelength selecting element 53 in the first embodiment. The reflection mirrors 53F and 54F are characterized by reflecting light having a first wavelength. The wavelength selecting element 51F and 52F and the reflection mirrors 53F and 54F form a mirror system.

The wavelength selecting element 51F is disposed in such a way that the angle of incidence of image light on the wavelength selecting element 51F is approximately degrees and inclined to the wavelength selecting element 52F by approximately 90 degrees. The wavelength selecting element 51F is disposed substantially in parallel to the reflection mirror 53F. The wavelength selecting element 52F is disposed substantially in parallel to the reflection mirror 54F. The distance between the wavelength selecting element 51F and the reflection mirror 53F differs from the distance between the wavelength selecting element 52F and the reflection mirror 54F.

In the optical path adjustment system 5F, the light L1 and the light L2 are first incident on the wavelength selecting element 51F. The light L2 passes through the wavelength selecting element 51F, impinges on the wavelength selecting element 52F, passes through the wavelength selecting element 52F, and exits out of the optical path adjustment system 5F.

The light L1 is reflected on the wavelength selecting element 51F, sequentially reflected on the reflection mirrors 53F and 54F, and incident on the wavelength selecting element 52F. The light L1 incident on the wavelength selecting element 52F is reflected on the wavelength selecting element 52F and exits out of the optical path adjustment system 5F along with the light L2 having passed through the wavelength selecting element 52F. The traveling direction of the light L1 is deflected each time the light L1 is reflected, and the optical path of the light L1 at the time when the light L1 exits out of the optical path adjustment system 5F becomes substantially parallel to the optical path of the light L2 but is spaced apart therefrom by the amount of shift.

As described above, adjusting the optical path of the light L1 reflected on the wavelength selecting surface also allows the optical path of the light L1 reflected on the wavelength selecting surface to be shifted from the optical path of the light L2 having passed through the wavelength selecting surface. The mirror system can alternatively be formed of a plurality of reflection members. Each of the reflection mirrors 53F and 54F may be formed of a dichroic mirror, which may, for example, have substantially the same characteristics as those of the wavelength selecting elements 51F and 52F.

Figure 13:
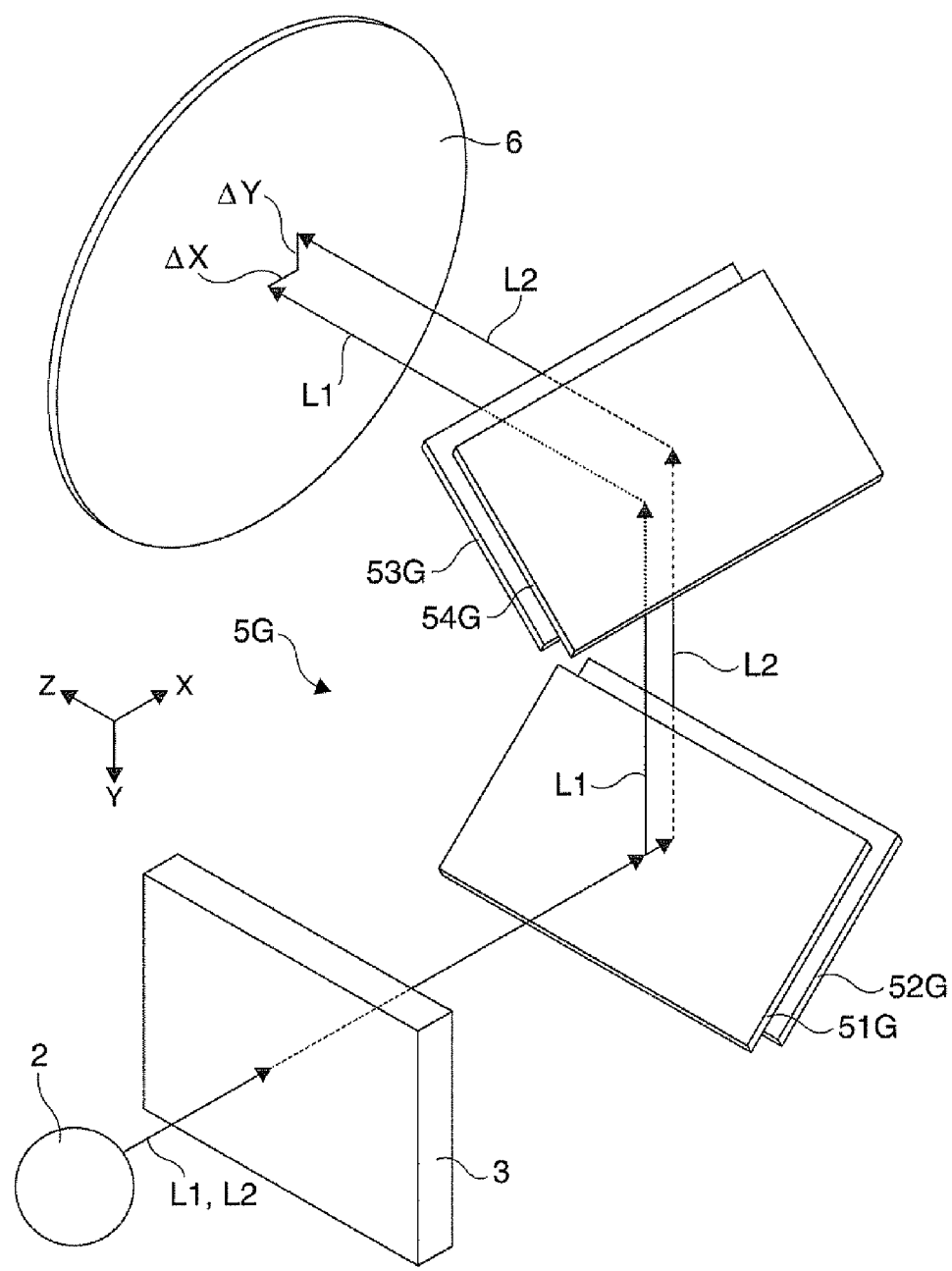
FIG. 13 is a schematic view showing the configuration of a sixth variation.

FIG. 13 is a perspective view showing the configuration of an optical path adjustment system 5G of a sixth variation. The optical path adjustment system 5G includes wavelength selecting elements 51G and 53G and reflection mirrors 52G and 54G, which are similar to those in the first embodiment. The wavelength selecting element 51G is paired with the reflection mirror 52G, and the wavelength selecting element 53G is paired with the reflection mirror 54G.

The wavelength selecting surface of the wavelength selecting element 51G is substantially parallel to the reflection surface of the reflection mirror 52G. The wavelength selecting surface and the reflection surface are substantially parallel to a plane obtained by rotating the XZ plane (or the YZ plane) around the Z axis by approximately 45 degrees.

The wavelength selecting surface of the wavelength selecting element 53G is substantially parallel to the reflection surface of the reflection mirror 54G. The wavelength selecting surface and the reflection surface are substantially parallel to a plane obtained by rotating the XZ plane (or the XY plane) around the X axis by approximately 45 degrees.

The light L1 and the light L2 having exited out of the light modulator 3 travel in the positive X direction and impinges on the wavelength selecting element 51G. The light L1 is reflected on the wavelength selecting element 51G, where the traveling direction of the light L1 is deflected by approximately 90 degrees, and travels in the negative Y direction. The light L2 passes through the wavelength selecting element 51G, is then reflected on the reflection mirror 52G, where the traveling direction of the light L2 is deflected by approximately 90 degrees, passes through the wavelength selecting element 51G again, and travels in the negative Y direction. The optical path of the light L1 reflected on the wavelength selecting element 51G is shifted from the optical path of the light L2 reflected on the reflection mirror 52G by $\Delta X$ in the X direction.

The light L1 and the light L2 traveling via the wavelength selecting element 51G in the negative Y direction are incident on the wavelength selecting element 53G. The light L1 is reflected on the wavelength selecting element 53G, where the traveling direction of the light L1 is deflected by approximately 90 degrees, and travels in the positive Z direction. The light L2 passes through the wavelength selecting element 53G, is then reflected on the reflection mirror 54G, where the traveling direction of the light L2 is deflected by approximately 90 degrees, passes through the wavelength selecting element 53G again, and travels in the positive Z direction. The optical path of the light L1 reflected on the wavelength selecting element 53G is shifted from the optical path of the light L2 reflected on the reflection mirror 54G by $\Delta Y$ in the Y direction.

The light L1 and the light L2 having traveled via the wavelength selecting element 53G are incident on the projection system 6. The optical path of the light L1 is shifted from the optical path of the light L2 by $\Delta X$ in the X direction and $\Delta Y$ in the Y direction when they are incident on the projection system 6.

As described with reference to the thus configured optical path adjustment system 5G, a set of a wavelength selecting surface and a reflection surface may be provided for each direction where the optical paths of the light L1 and L2 are shifted from each other. In this way, $\Delta X$ can be set in accordance with the distance between the wavelength selecting element 51G and the reflection mirror 52G, and $\Delta Y$ can be set in accordance with the distance between the wavelength selecting element 53G and the reflection mirror 54G. That is, the amounts of shift in the two directions can be set independently.

Second Embodiment

Figure 14:
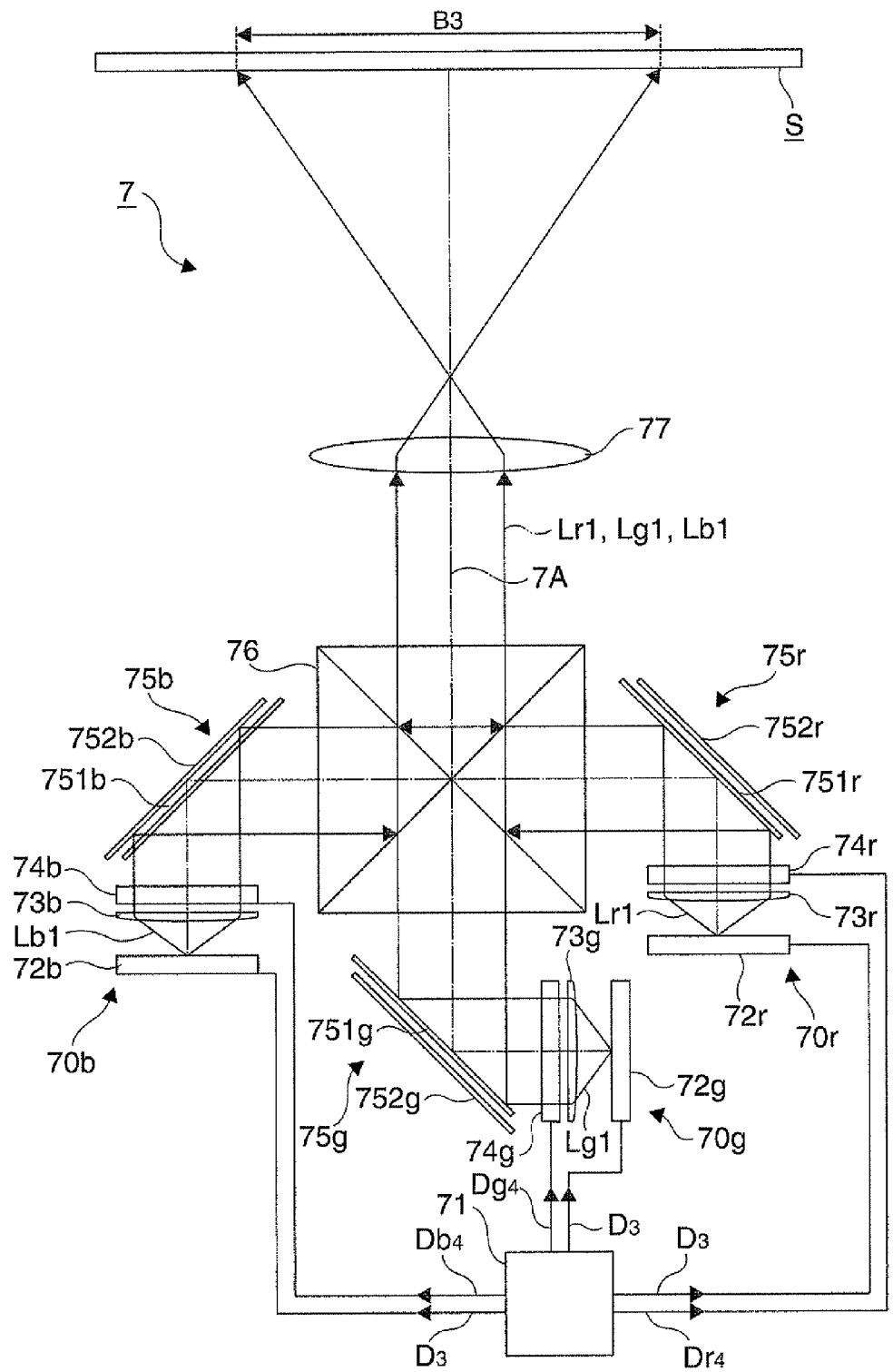
FIG. 14 is a schematic view showing the configuration of an image display apparatus of a second embodiment.
Figure 15:
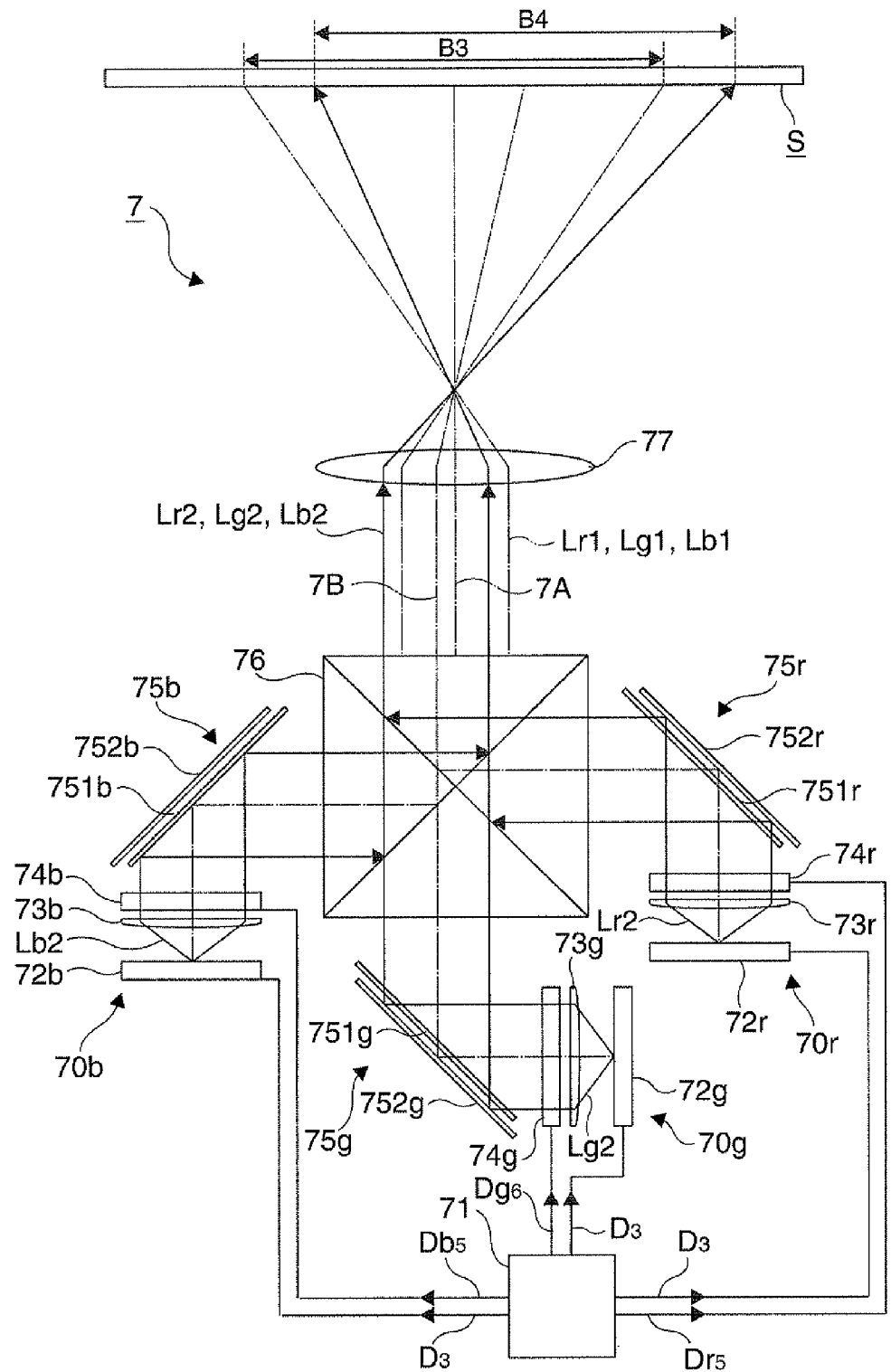
FIG. 15 is a schematic view showing the shift of an optical path in the second embodiment.
Figure 16A:
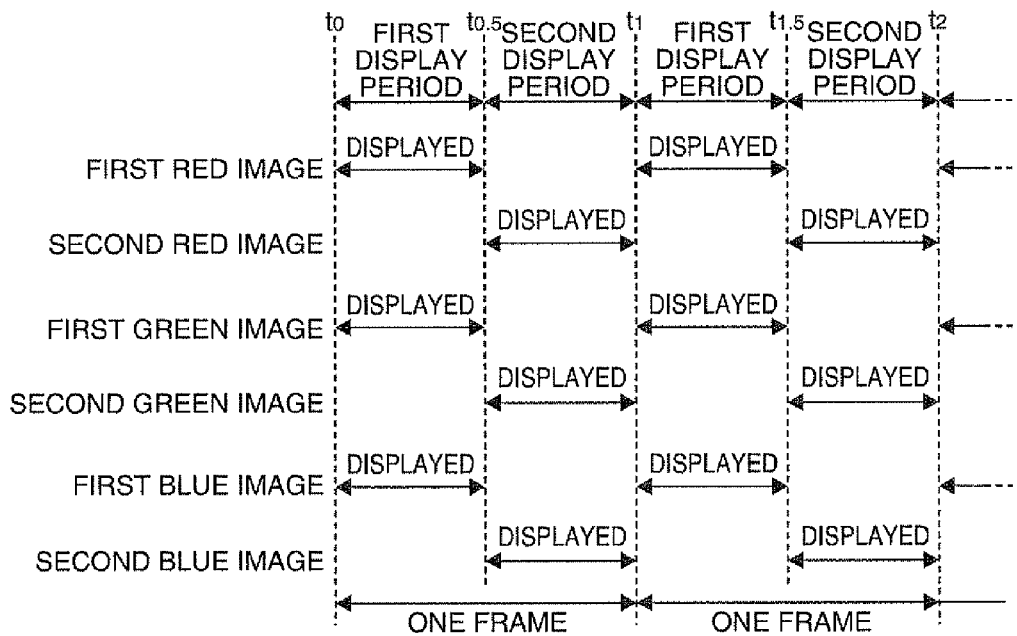
FIG. 16A is a timing chart showing image display timing for each hue.
Figure 16B:
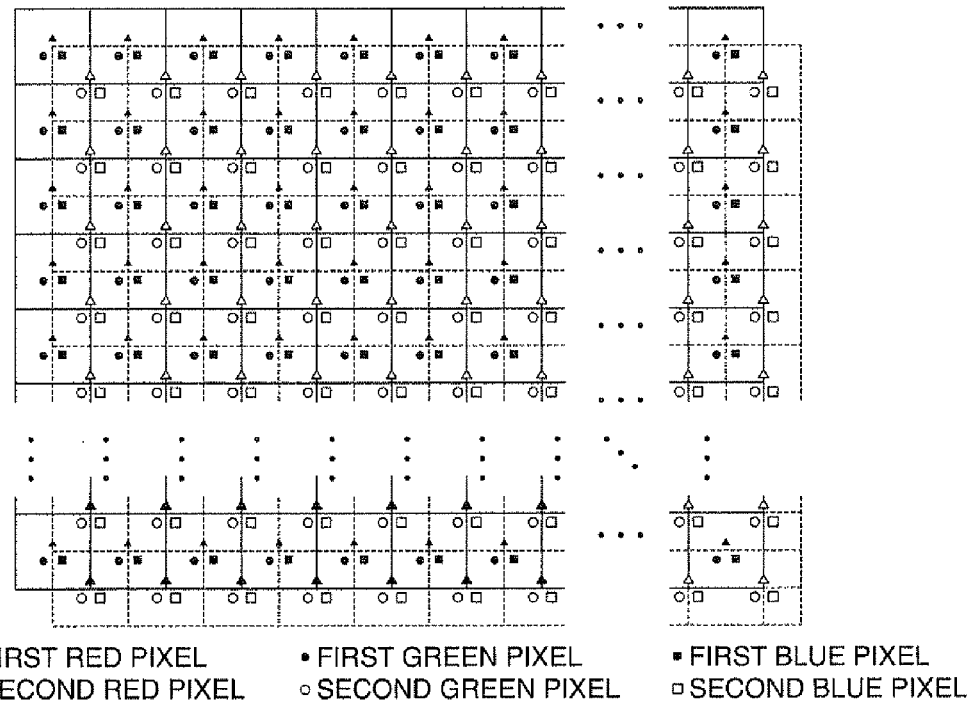
FIG. 16B is a conceptual diagram of an entire displayed image.

A projector of a second embodiment will next be described with reference to FIGS. 14, 15, 16A, and 16B. FIGS. 14 and 15 are schematic views showing the configuration of a projector 7 of the second embodiment. FIG. 16A is a timing chart showing image display timing for each hue. FIG. 16B is a conceptual diagram of an entire displayed image. FIG. 14 shows a state in which a first image B3 is displayed, and FIG. 15 shows a state in which a second image B4 is displayed.

The projector 7 includes three image formation systems 70r, 70g, and 70b, a controller 71, a light combining element 76, and a projection system 77. The configuration of each of the image formation systems 70r, 70g, and 70b is the same as the configuration of the projector 1 of the first embodiment from which the projection system 6 is removed. In the second embodiment, the image formation system 70g is disposed along a first optical path 7A of the light that exits out of the light combining element 76 but on the side opposite to the projection system 77. The image formation systems 70r and 70b are disposed on opposite sides of the light combining element 76 and face each other in a direction substantially perpendicular to the first optical path 7A.

The controller 71 supplies a timing signal $D_3$ to each of the image formation systems 70r, 70g, and 70b. During a first display period, the controller 71 supplies a modulation signal $Dr_4$ for first red light Lr1 to the image formation system 70r, a modulation signal $Dg_4$ for first green light Lg1 to the image formation system 70g, and a modulation signal $Db_4$ for first blue light Lb1 to the image formation system 70b. During a second display period, the controller 71 supplies a modulation signal $Dr_5$ for second red light Lr2 to the image formation system 70r, a modulation signal $Dg_5$ for second green light Lg2 to the image formation system 70g, and a modulation signal $Db_5$ for second blue light Lb2 to the image formation system 70b.

As shown in FIGS. 16A and 16B, during the first display period, a first red image, a first green image, and a first blue image are displayed in substantially the same position so that a full-color first image B3 is displayed. During the second display period, a second red image, a second green image, and a second blue image are displayed in substantially the same position so that a full-color second image B4 is displayed. The position of each pixel that forms the second image B4 is shifted from the position of each pixel that forms the first image B3.

The image formation system 70r includes the controller 71, a light source 72r, a field lens 73r, light modulator 74r, and an optical path adjustment system 75r. The light source 72r and the field lens 73r form a light source system. The light source 72r emits the first red light Lr1 and the second red light Lr2 based on the timing signal $D_3$ switched with time. Each of the first red light Lr1 and the second red light Lr2 has a spectral peak in a wavelength band that belongs to a red hue (wavelength longer than or equal to 625 nm but shorter than or equal to 740 nm, for example).

The red light Lr1 and the red light Lr2 emitted from the light source 72r are incident on the field lens 73r, where they are parallelized, and then incident on the light modulator 74r. The red light Lr1 and the red light Lr2 incident on the light modulator 74r undergo time division modulation and then impinge on the optical path adjustment system 75r. The red light Lr1 incident on the optical path adjustment system 75r is reflected on a wavelength selecting element 751r and incident on the light combining element 76. The red light Lr2 incident on the optical path adjustment system 75r passes through the wavelength selecting element 751r, is then reflected on a reflection mirror 752r, passes through the wavelength selecting element 751r again, and impinges on the light combining element 76.

The image formation system 70g has the same configuration as that of, the image formation system 70r. A light source 72g emits the first green light Lg1 and the second green light Lg2 switched with time. Each of the first green light Lg1 and the second green light Lg2 has a spectral peak in a wavelength band that belongs to a green hue (wavelength longer than or equal to 500 nm but shorter than or equal to 565 nm, for example).

The green light Lg1 and the green light Lg2 are incident on a field lens 73g, where they are parallelized, and incident on a light modulator 74g, where they undergo time division modulation. The green light Lg1 incident on an optical path adjustment system 75g is reflected on a wavelength selecting element 751g and incident on the light combining element 76. The green light Lg2 incident on the optical path adjustment system 75g passes through the wavelength selecting element 751g, is reflected on a reflection mirror 752g, then passes through the wavelength selecting element 751g again, and impinges on the light combining element 76.

The image formation system 70b differs from the image formation systems 70r and 70g in that a wavelength selecting element 751b transmits the first blue light Lb1 and reflects the second blue light Lb2. A light source 72b emits the first blue light Lb1 and the second blue light Lb2 switched with time. Each of the first blue light Lb1 and the second blue light Lb2 has a spectral peak in a wavelength band that belongs to a blue hue (wavelength longer than or equal to 450 nm but shorter than or equal to 485 nm, for example).

The blue light Lb1 and the blue light Lb2 are incident on a field lens 73b, where they are parallelized, and incident on a light modulator 74b, where they undergo time division modulation. The blue light Lb1 incident on an optical path adjustment system 75b passes through a wavelength selecting element 751b, is reflected on a reflection mirror 752b, then passes through the wavelength selecting element 751b again, and impinges on the light combining element 76. The blue light Lb2 incident on the optical path adjustment system 75b is reflected on the wavelength selecting element 751b and incident on the light combining element 76.

The light combining element 76 is formed of a dichroic prism. The dichroic prism has two types of wavelength selective reflection film provided therein. One of the two types of reflection film is characterized by reflecting the red light Lr1 and Lr2 and transmitting the green light Lg1 and Lg2 and the blue light Lb1 and Lb2. The other one of the two types of reflection film is characterized by reflecting the blue light Lb1 and Lb2 and transmitting the green light Lg1 and Lg2 and the red light Lr1 and Lr2. The two types of reflection film are disposed to be perpendicular to each other. In the second embodiment, one of the reflection films is inclined to the optical paths of the red light Lr1 and Lr2 that have not yet been incident on the light combining element 76 by approximately 45 degrees. The other one of the reflection films is inclined to the optical paths of the blue light Lb1 and Lb2 that have not yet been incident on the light combining element 76 by approximately 45 degrees.

During the first display period, the optical path of the first red light Lr1 to be incident on the light combining element 76 through the image formation system 70r substantially coincides with the optical path of the first blue light Lg1 to be incident on the light combining element 76 through the image formation system 70b. The traveling directions of the red light Lr1 and the blue light Lb1 that are incident on the light combining element 76 and exit out thereof are deflected and substantially coincide with the optical path of the green light Lg1 (first optical path 7A) having passed through the light combining element 76. That is, the first red light Lr1, the first green light Lg1, and the first blue light Lb1 incident on the light combining element 76 are combined with their optical paths aligned with the first optical path 7A and then projected on a projection surface S through the projection system 77.

During the second display period, the optical path of the second red light Lr2 to be incident on the light combining element 76 through the image formation system 70r is shifted from the optical path of the second blue light Lb2 to be incident on the light combining element 76 through the image formation system 70b. The traveling directions of the red light Lr2 and the blue light Lb2 that are incident on the light combining element 76 and exit out thereof during the second display period are deflected and substantially coincide with the optical path of the green light Lg2 having passed through the light combining element 76. That is, the second red light Lr2, the second green light Lg2, and the second blue light Lb2 incident on the light combining element 76 are combined with their optical paths aligned with a second optical path 7B and then projected on the projection surface S through the projection system 77.

A description will be made of the direction in which the light exiting position is shifted when the light incident position on the light combining element 76 is shifted. Consider the following configuration (referred to as Comparative Example) and compare it with the present embodiment: In Comparative Example, the positive or negative directions in which the red and blue light incident positions on the light combining element are shifted (the direction along the first optical path 7A) during the first display period is the same as those during the second display period. Comparative Example has, for example, a configuration in which the first blue light is reflected on a wavelength selecting element during the first display period and the second blue light passes through the wavelength selecting element during the second display period.

In the configuration of Comparative Example, when the first display period transits to the second display period, the optical path of the blue light having exited out of the light combining element 76 is shifted toward the red light image formation system and the optical path of the red light having exited out of the light combining element 76 is shifted toward the blue light image formation system. That is, the positions where the blue light and the red light exit out of the light combining element 76 are shifted in opposite directions.

In the present embodiment, the directions in which the positions where the light fluxes from the image formation systems 70r and 70b are incident on the light combining element 76 are shifted during the first display period are opposite to those during the second display period. As a result, the directions in which the positions where the light fluxes from the image formation systems 70r and 70b exit out of the light combining element 76 are shifted during the first display period are the same as those during the second display period, whereby the optical paths of the light fluxes having traveled via the light combining element 76 can be aligned with each other during both the first and second display periods.

Since the second optical path 7B corresponding to the second image B4 is shifted from the first optical path 7A corresponding to the first image B3, the second image B4 is displayed in a position shifted from the position where the first image B3 is displayed, as shown in FIG. 16B. The displayed images B3 and B4 are switched with time fast enough not to allow the viewer to be aware of the switching. The viewer observes the images B3 and B4 superimposed with the positions of the pixels thereof shifted from each other, whereby an effectively high-resolution image is displayed.

As described above, the projector 7, which can display an image having a large number of hues, is capable of displaying a high-quality image.

As a configuration in which the directions in which the optical paths are shifted from each other by the image formation systems disposed on opposite sides of the light combining element during the first display period are opposite to those during the second display period, the following configurations can also be employed: In a first exemplary configuration, first blue light Lb1 is reflected on a wavelength selecting element; second blue light Lb2 passes through the wavelength selecting element; first red light Lr1 passes through another wavelength selecting element; and second red light Lr2 is reflected on the other wavelength selecting element. To achieve the configuration, the configurations of the light sources or the characteristics of the wavelength selecting elements may be changed.

In a second exemplary configuration, the direction in which the light emitted from a light source system and directed toward an optical path adjustment system travel in an image formation system disposed on one side of a light combining element is opposite to that in another image formation system disposed on the other side of the light combining element. To achieve the configuration, for example, the position of the image formation system corresponding to the blue light may be reversed with respect to a plane perpendicular to the first optical path 7A. The fact that the blue light image is reversed can be compensated by adjusting the arrangement of the pixels in a modulation signal.

Alternatively, the direction in which the optical paths of the blue light are shifted from each other may differ from the direction in which the optical paths of the red light are shifted from each other. In either case, a modulation signal representing data that the pixels should display in shifted positions may be produced based, for example, on data on input image pixels corresponding to the positions of the displayed pixels.

Third Embodiment

Figure 17:
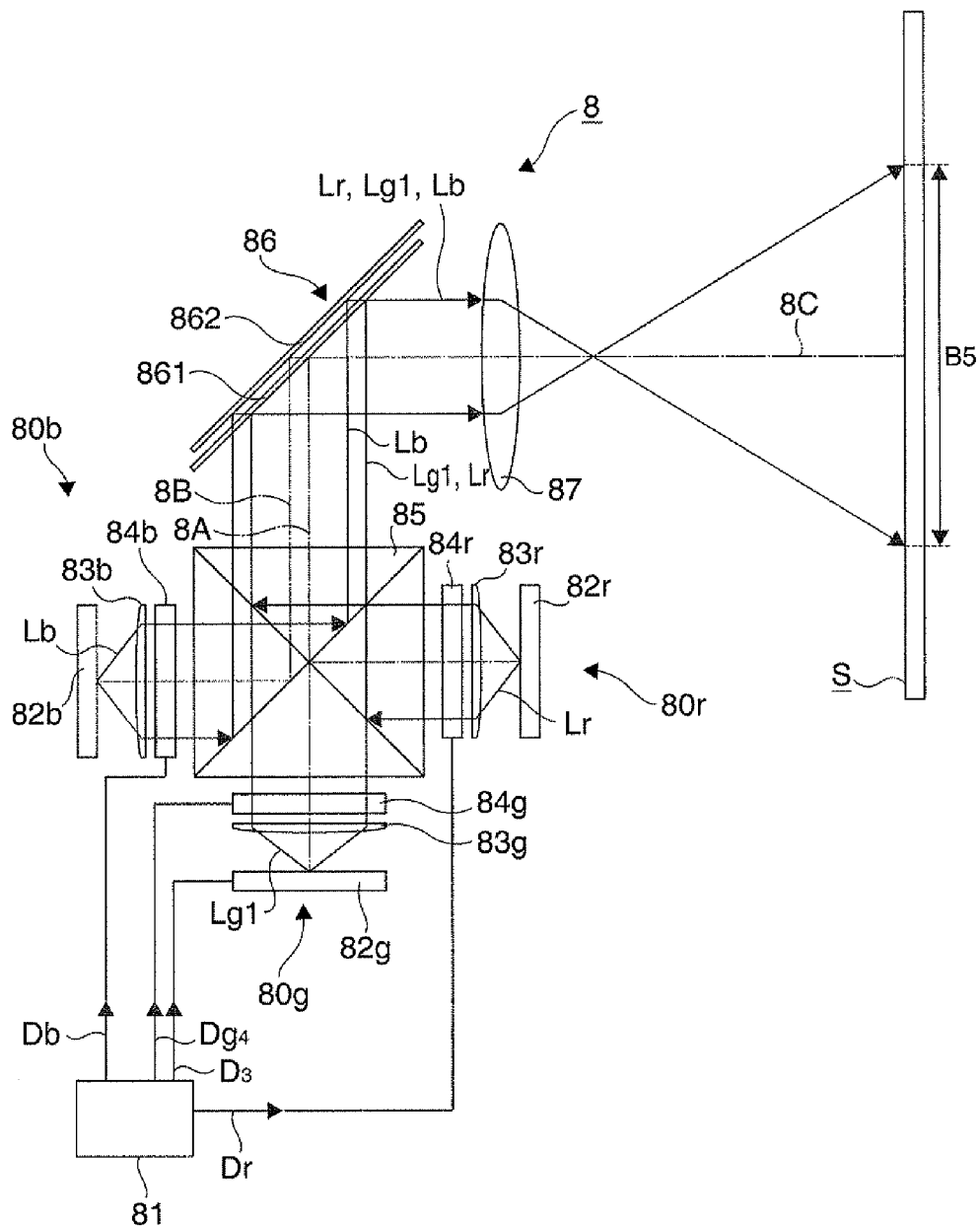
FIG. 17 is a schematic view showing the configuration of an image display apparatus of a third embodiment.
Figure 18:
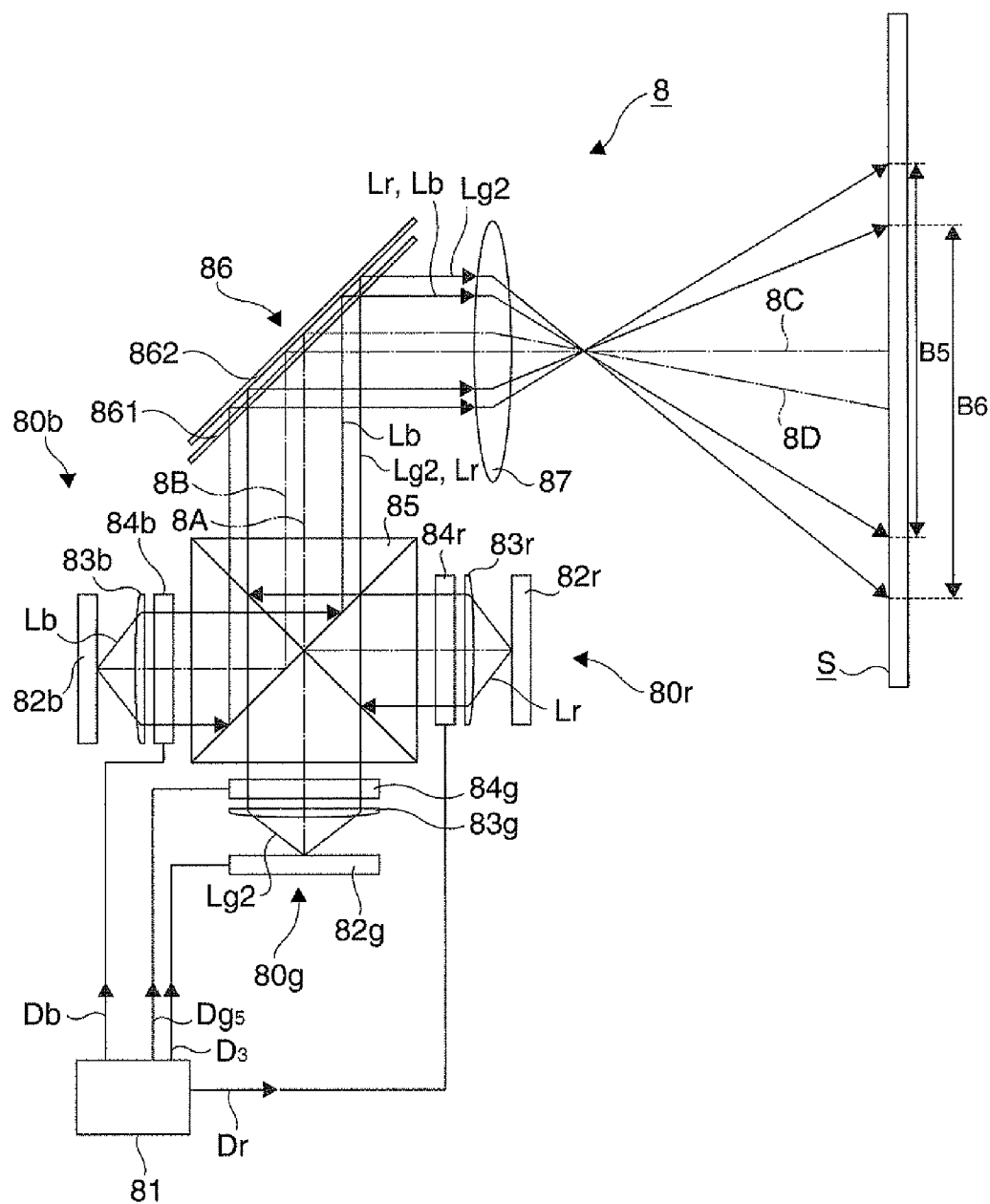
FIG. 18 is a schematic view showing the shift of an optical path in the third embodiment.
Figure 19:
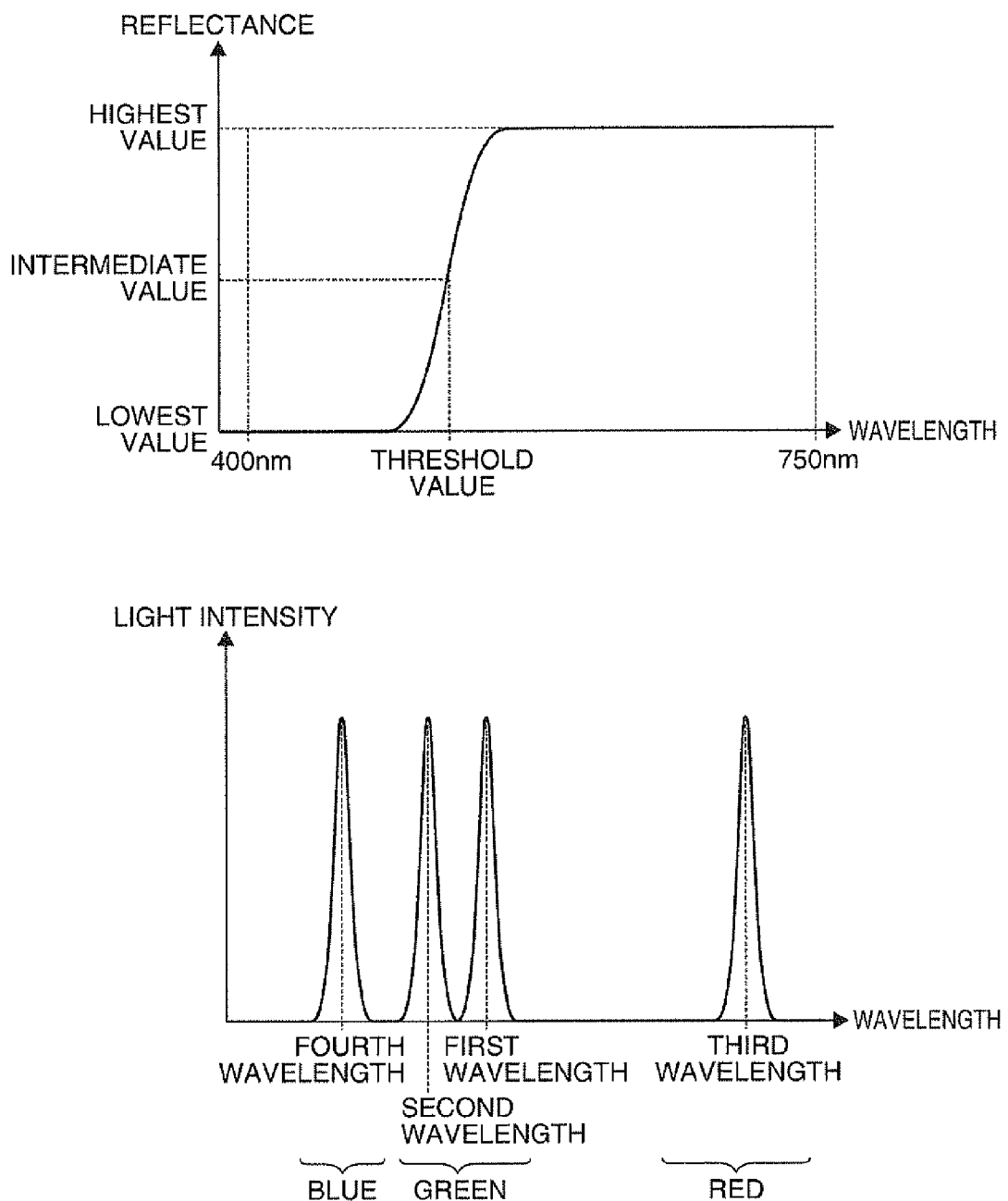
FIG. 19 shows graphs illustrating the characteristics of a wavelength selecting surface versus first to fourth wavelengths.
Figure 20A:
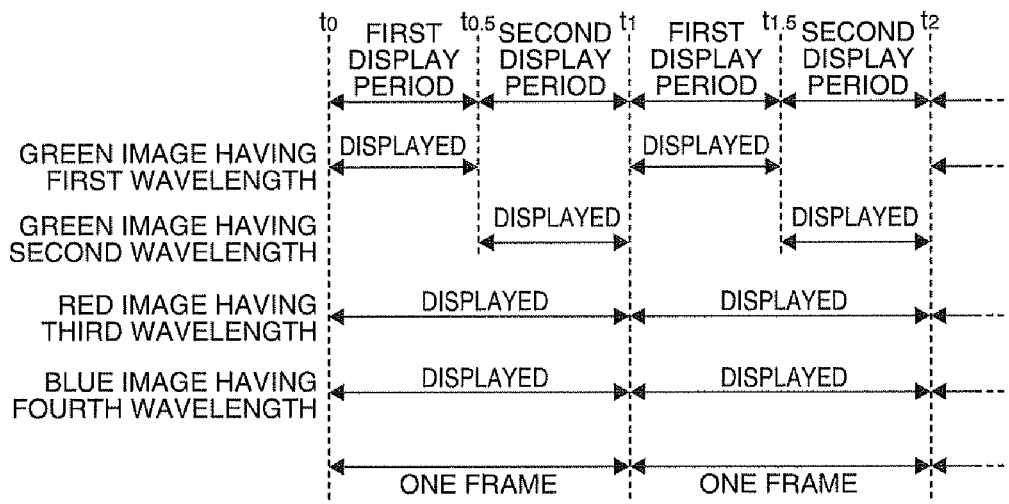
FIG. 20A is a timing chart showing image display timing for each hue.
Figure 20B:
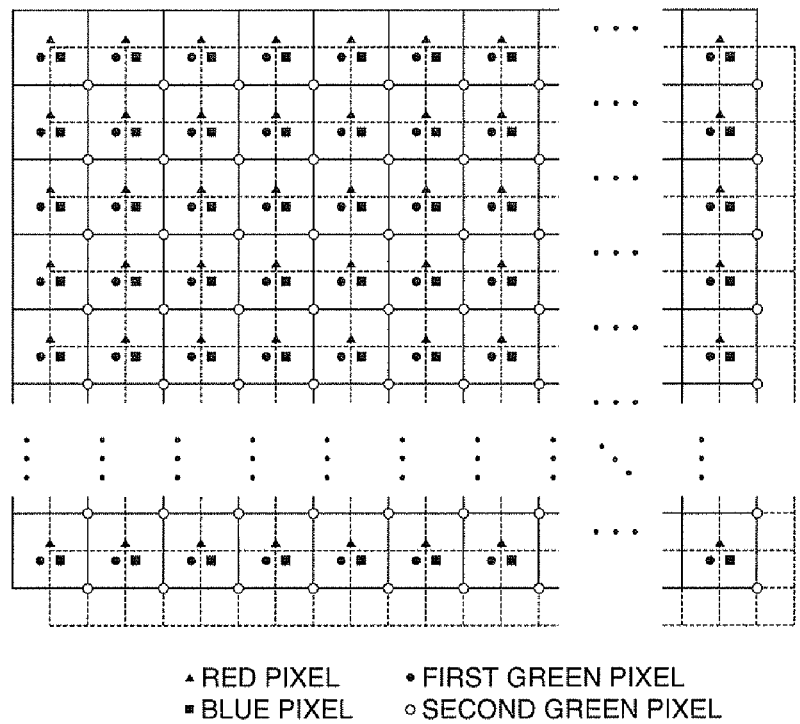
FIG. 20B is a conceptual diagram of an entire displayed image.

A projector of a third embodiment will next be described with reference to FIGS. 17, 18, 19, 20A, and 20B. FIGS. 17 and 18 are schematic views showing the configuration of a projector 8 of the third embodiment. FIG. 19 shows graphs illustrating the characteristics of a wavelength selecting surface versus first to fourth wavelengths. FIG. 20A is a timing chart showing image display timing for each hue, and FIG. 20B is a conceptual diagram of an entire displayed image. FIG. 17 shows a state in which a first image B5 is displayed, and FIG. 18 shows a state in which a second image 86 is displayed.

The third embodiment is similar to the second embodiment in that an image is displayed by using a plurality of color light fluxes having different wavelengths. The third embodiment differs from the second embodiment in that the optical paths of one of the plurality of color light fluxes are shifted from each other when the first display period transits to the second display period.

As shown in FIGS. 17 and 18, the projector 8 includes three image formation systems 80r, 80g, and 80b, a controller 81, a light combining element 85, an optical path adjustment system 86, and a projection system 87. The image formation system 80g is disposed along a first optical path 8A of the light that exits out of the light combining element 85 but on the side opposite to the optical path adjustment system 86. The image formation systems 80r and 80b are disposed on opposite sides of the light combining element 85 and face each other in a direction substantially perpendicular to a first optical path 8A.

The controller 81 supplies a modulation signal Dr for red light to the image formation system 80r and a modulation signal Db for blue light to the image formation system 80b throughout the first and second display periods. The controller 81 supplies a modulation signal $Dg_4$ for first green light Lg1 to the image formation system 80g during the first display period. The controller 81 supplies a modulation signal $Dg_5$ for second green light Lg2 to the image formation system 80g during the second display period.

As shown in FIGS. 20A and 20B, during the first display period, a red image, a first green image, and a blue image are displayed in substantially the same position so that a full-color first image B5 is displayed. The red image and the blue image are kept displayed during the second display period following the first display period. During the second display period, a second green image is displayed instead of the first green image. The position of each pixel of the second green image is shifted from the position of each pixel of the first green image. During the second display period, the red image, the second green image, and the blue image form a full-color second image B6.

The image formation system 80g includes a light source 82g, a field lens 83g, and a light modulator 84g. The light source 82g and the field lens 83g form a light source system. The light source 82g emits the green light Lg1 having a first wavelength and the green light Lg2 having a second wavelength based on a timing signal $D_3$ switched with time. The green light Lg1 and the green light Lg2 emitted from the light source 82g are incident on the field lens 83g, where they are parallelized, and then incident on the light modulator 84g. The light modulator 84g modulates the first green light Lg1 based on the modulation signal $Dg_4$ and modulates the second green light Lg2 based on the modulation signal $Dg_5$. The light Lg1 and the light Lg2 modulated by the light modulator 84g impinge on the light combining element 85, pass through the light combining element 85, and impinge on the optical path adjustment system 86. The optical paths of the green light Lg1 and Lg2 having exited out of the light combining element 85 substantially coincide with the first optical path 8A.

The image formation system 80r includes a light source 82r, a field lens 83r, and a second light modulator 84r. The light source 82r and the field lens 83r form a second light source system. The light source 82r emits red light Lr having a third wavelength longer than the first and second wavelengths. The red light Lr emitted from the light source 82r is incident on the field lens 83r, where they are parallelized, and then incident on the second light modulator 84r. The second light modulator 84r modulates the red light Lr based on the modulation signal Dr. The red light Lr modulated by the second light modulator 84r impinges on the light combining element 85, where the traveling direction of the red light Lr is deflected, and exits out of the light combining element 85 along the first optical path 8A. The red light Lr having exited out of the light combining element 85 impinges on the optical path adjustment system 86.

The image formation system 80b includes a light source 82b, a field lens 83b, and a third light modulator 84b. The light source 82b and the field lens 83b form a third light source system. The light source 82b emits blue light Lb having a fourth wavelength shorter than the first and second wavelengths. The blue light Lb emitted from the light source 82b is incident on the field lens 83b, where they are parallelized, and then incident on the third light modulator 84b. The third light modulator 84b modulates the blue light Lb based on the modulation signal Db. The blue light Lb modulated by the third light modulator 84b impinges on the light combining element 85, where the traveling direction of the blue light Lb is deflected, and exits out of the light combining element 85 along a second optical path 8B. The blue light Lb having exited out of the light combining element 85 impinges on the optical path adjustment system 86.

During the first display period, the first green light Lg1 incident on the optical path adjustment system 86 is reflected on a wavelength selecting element 861 and travels along a third optical path 8C. The first green light Lg1 having exited out of the optical path adjustment system 86 enters the projection system 87 and is projected on a projection surface S.

During the second display period, the second green light Lg2 incident on the optical path adjustment system 86 passes through the wavelength selecting element 861, is reflected on a reflection mirror 862, and travels along a fourth optical path 8D. The second green light Lg2 reflected on the reflection mirror 862 passes the wavelength selecting element 861 again, enters the projection system 87, and is projected on the projection surface S.

As described above, since the optical paths of the green light Lg1 and Lg2 are shifted from each other in the optical path adjustment system 86, the second green image is displayed in a position different from the position where the first green image is displayed.

Throughout the first and second display periods, the red light Lr incident on the optical path adjustment system 86 is reflected on the wavelength selecting element 861 and travels along the third optical path 8C. The red light Lr having exited out of the optical path adjustment system 86 enters the projection system 87 and is projected on the projection surface S.

Throughout the first and second display periods, the blue light Lb incident on the optical path adjustment system 86 passes through the wavelength selecting element 861, is reflected on the reflection mirror 862, and travels along the third optical path 8C. The blue light Lb reflected on the reflection mirror 862 passes through the wavelength selecting element 861 again, enters on the projection system 87, and is projected on the projection surface S.

Looking at the relationship between the optical path of the blue light Lb and the optical path of the red light Lr, one can see that the optical path of the blue light Lb is shifted from the optical path of the red light Lr substantially in parallel thereto after the blue light Lb and the red light Lr travel via the optical path adjustment system 86. To cancel the optical path shift in the optical path adjustment system 86, the second optical path 8B is set to be shifted from the first optical path 8A. Specifically, the arrangement of the image formation systems 80b and 80r is adjusted in such a way that the position where the light from the image formation system 80b is incident on the light combining element 85 is shifted from the position where the light from the image formation system 80r is incident on the light combining element 85. In this way, the red image and the blue image are displayed in substantially the same position as the position where the first green image is displayed throughout the first and second display periods.

The thus configured projector 8, which can display an image having a large number of hues, is capable of displaying a high-quality image. As compared with the projector of the second embodiment, the number of optical path adjustment systems can be reduced, whereby the configuration of the apparatus can be simplified. Since the pixels of an image of a color for which the visual angle sensitivity is relatively high among a plurality of colors (red, green, and blue) are shifted, a sense of high resolution is provided in an effective manner. The projector 8 having a simple configuration described above can still display a high-quality image.

In the projectors of the second and third embodiments, the light source systems, the light modulators, and the optical path adjustment systems can be changed as appropriate by employing the variety of variations described above. For example, the light source system in the image formation system 80g may be the light source system 2C shown in FIG. 11B.

The entire disclosure of Japanese Patent Application No. 2009-242512, filed Oct. 21, 2009 is expressly incorporated by reference herein.

What is claimed is:
1. An image display apparatus comprising:
a light source system that emits light having a first wavelength and light having a second wavelength switched with time;
a light modulator that modulates the light having the first wavelength and the light having the second wavelength emitted from the light source system;
an optical path adjustment system that shifts the optical paths of the light having the first wavelength and the light having the second wavelength modulated by the light modulator from each other; and
a projection system that projects the light having traveled via the optical path adjustment system, wherein
the optical path adjustment system includes:
a wavelength selecting surface that reflects the light having the first wavelength and transmits the light having the second wavelength; and
a mirror system disposed in such a way that the optical paths of the light having the first wavelength and the light having the second wavelength having traveled via the wavelength selecting surface are shifted from each other but the traveling directions thereof are the same.

2. The image display apparatus according to claim 1, wherein the optical path adjustment system produces the amount of shift by which the optical path of the light having the first wavelength and the optical path of the light having the second wavelength are shifted from each other in such a way that a pixel formed by the light having the first wavelength overlaps with a plurality of pixels formed by the light having the second wavelength in an imaging plane where the light projected through the projection system is focused.

3. The image display apparatus according to claim 1, wherein the mirror system is formed of a reflection surface disposed substantially in parallel to the wavelength selecting surface.

4. The image display apparatus according to claim 3, wherein the wavelength selecting surface is formed on the same optical element on which the reflection surface is formed.

5. The image display apparatus according to claim 1, wherein the light source system includes a first solid-state light source, that emits light having the first wavelength and a second solid-state light source that emits light having the second wavelength, and
the first and second solid-state light sources are driven in such a way that the period during which the first solid-state light source is turned on is shifted from the period during which the second solid-state light source is turned on.

6. The image display apparatus according to claim 5, further comprising a controller that controls the light source system and the light modulator,
wherein the controller supplies a first modulation signal corresponding to an image to be displayed by using the light having the first wavelength and a second modulation signal corresponding to an image to be displayed by using the light having the second wavelength to the light modulator switched with time to turn on the first solid-state light source in synchronization with the first modulation signal and turn on the second solid-state light source in synchronization with the second modulation signal.

7. The image display apparatus according to claim 5, wherein at least one of the first and second solid-state light sources is formed of a light emitting diode.

8. The image display apparatus according to claim 5, wherein at least one of the first and second solid-state light sources is formed of a laser diode.

9. The image display apparatus according to claim 1, further comprising:
a second light source system that emits light having a third wavelength longer than the first and second wavelengths;
a third light source system that emits light having a fourth wavelength shorter than the first and second wavelengths;
a second light modulator that modulates the light emitted from the second light source system;
a third light modulator that modulates the light emitted from the third light source system; and
a light combining element that combines the light modulated by the light modulator, the light modulated by the second light modulator, and the light modulated by the third light modulator,
wherein the wavelength selecting surface reflects one of light having a wavelength longer than a predetermined wavelength between the first and second wavelengths and light having a wavelength shorter than the predetermined wavelength and transmits the other light,
the optical paths of the light fluxes that exit out of the light combining element are configured in such a way that one of the optical path of the light having the third wavelength and the optical path of the light having the fourth wavelength substantially coincides with the optical path of the light having the first wavelength, and that the optical path of the light having the third wavelength is shifted from the optical path of the light having the fourth wavelength, and
the amount of shift by which the optical path of the light having the third wavelength that exits out of the light combining element and the optical path of the light having the fourth wavelength that exits out of the light combining element are shifted from each other is set in such a way that the optical path of the light of the third wavelength having traveled via the optical path adjustment system substantially coincides with the optical path of the light of the fourth wavelength having traveled via the optical path adjustment system.

* * * * *